United States Patent
Ramaswamy et al.

(10) Patent No.: US 8,824,740 B2
(45) Date of Patent: *Sep. 2, 2014

(54) METHODS AND APPARATUS FOR DETECTING A COMPOSITION OF AN AUDIENCE OF AN INFORMATION PRESENTING DEVICE

(71) Applicant: The Nielsen Company (US), LLC, Schaumburg, IL (US)

(72) Inventors: Arun Ramaswamy, Tampa, FL (US); Daniel J. Nelson, Tampa, FL (US); Venugopal Srinivasan, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,379

(22) Filed: Dec. 23, 2013

(65) Prior Publication Data

US 2014/0105462 A1    Apr. 17, 2014

Related U.S. Application Data

(63) Continuation of application No. 13/459,908, filed on Apr. 30, 2012, now Pat. No. 8,660,308, which is a
(Continued)

(51) Int. Cl.
*G06K 9/00* (2006.01)
*H04H 60/33* (2008.01)
(Continued)

(52) U.S. Cl.
CPC ........... *G06K 9/00362* (2013.01); *H04H 60/33* (2013.01); *H04H 60/45* (2013.01); *H04H 60/43* (2013.01); *H04N 7/17309* (2013.01); *H04N 21/258* (2013.01)
USPC ...................................................... 382/103

(58) Field of Classification Search
USPC ......... 382/103, 115, 116, 118, 154, 168, 227, 382/236, 274, 284; 348/E7.001, E7.07, 348/E7.083; 367/87, 104; 725/1, 10, 12, 14, 725/15
See application file for complete search history.

(56) References Cited

U.S. PATENT DOCUMENTS 3,805,238 A  * 4/1974 Rothfjell .................. 382/118
4,468,807 A  * 8/1984 Moulton .................. 382/115
(Continued)

FOREIGN PATENT DOCUMENTS

EP    0 262 757    4/1988
EP    1 133 090    9/2001
(Continued)

OTHER PUBLICATIONS

Duncan Graham-Rowe, "Hot Shopping," New Scientist Magazine, Issue 2230, Mar. 18, 2000, p. 12, retrieved from http://www.newscientist.com/article.ns?id=mg16522301.700&print=true.
(Continued)

*Primary Examiner* — Amir Alavi
(74) *Attorney, Agent, or Firm* — Hanley, Flight & Zimmerman, LLC

(57) ABSTRACT

Methods and apparatus for detecting a composition of an audience of an information presenting device are disclosed. A disclosed example method includes maintaining a first count of a number of people detected in an environment based on image data representative of the environment; when the image data is indicative of a change in the number of people detected in the environment, presenting a request for identity information; determining if the people were compliant in providing the identity information based on a difference between the number of people appearing in the image data and a second number of received identity responses; and when the people were non-compliant in providing the identity information, increasing a second count maintained for the environment indicative of unidentified people in the room.

20 Claims, 16 Drawing Sheets

Related U.S. Application Data continuation of application No. 12/533,629, filed on Jul. 31, 2009, now Pat. No. 8,194,923, which is a continuation of application No. 10/538,692, filed as application No. PCT/US02/39625 on Dec. 11, 2002, now Pat. No. 7,609,853.

(51) Int. Cl.

| | | |
|---|---|---|
| *H04H 60/45* | (2008.01) | |
| *H04N 7/173* | (2011.01) | |
| *H04N 21/258* | (2011.01) | |
| *H04H 60/43* | (2008.01) | |

(56) References Cited

U.S. PATENT DOCUMENTS

| | | | | |
|---|---|---|---|---|
| 4,611,347 | A * | 9/1986 | Netravali et al. | 382/159 |
| 4,626,904 | A * | 12/1986 | Lurie | 725/10 |
| 4,644,509 | A * | 2/1987 | Kiewit et al. | 367/87 |
| 4,658,290 | A * | 4/1987 | McKenna et al. | 725/14 |
| 4,769,697 | A * | 9/1988 | Gilley et al. | 725/12 |
| 4,779,198 | A | 10/1988 | Lurie | |
| 4,843,631 | A | 6/1989 | Steinpichler et al. | |
| 4,849,737 | A | 7/1989 | Kirihata et al. | |
| 4,858,000 | A | 8/1989 | Lu | |
| 4,993,049 | A | 2/1991 | Cupps | |
| 5,031,228 | A | 7/1991 | Lu | |
| 5,063,603 | A | 11/1991 | Burt | |
| 5,067,160 | A | 11/1991 | Omata et al. | |
| 5,097,328 | A | 3/1992 | Boyette | |
| 5,099,324 | A | 3/1992 | Abe | |
| 5,121,201 | A | 6/1992 | Seki | |
| 5,144,797 | A | 9/1992 | Swars | |
| 5,164,992 | A | 11/1992 | Turk et al. | |
| 5,229,764 | A | 7/1993 | Matchett et al. | |
| 5,331,544 | A | 7/1994 | Lu et al. | |
| 5,373,315 | A | 12/1994 | Dufresne et al. | |
| 5,384,716 | A | 1/1995 | Araki et al. | |
| 5,412,738 | A | 5/1995 | Brunelli et al. | |
| 5,481,622 | A | 1/1996 | Gerhardt et al. | |
| 5,497,185 | A | 3/1996 | Dufresne et al. | |
| 5,550,928 | A | 8/1996 | Lu et al. | |
| 5,629,752 | A | 5/1997 | Kinjo | |
| 5,675,663 | A | 10/1997 | Koerner et al. | |
| 5,715,325 | A | 2/1998 | Bang et al. | |
| 5,719,951 | A | 2/1998 | Shackleton et al. | |
| 5,771,307 | A | 6/1998 | Lu et al. | |
| 5,781,650 | A | 7/1998 | Lobo et al. | |
| 5,793,409 | A | 8/1998 | Tetsumura | |
| 5,801,763 | A | 9/1998 | Suzuki | |
| 5,805,745 | A | 9/1998 | Graf | |
| 5,835,616 | A | 11/1998 | Lobo et al. | |
| 5,850,470 | A | 12/1998 | Kung et al. | |
| 5,859,921 | A | 1/1999 | Suzuki | |
| 5,864,630 | A | 1/1999 | Cosatto et al. | |
| 5,878,156 | A | 3/1999 | Okumura | |
| 5,892,837 | A | 4/1999 | Luo et al. | |
| 5,901,244 | A | 5/1999 | Souma et al. | |
| 5,920,641 | A | 7/1999 | Ueberreiter et al. | |
| 5,963,670 | A | 10/1999 | Lipson et al. | |
| 5,978,507 | A | 11/1999 | Shackleton et al. | |
| 5,987,154 | A | 11/1999 | Gibbon et al. | |
| 6,032,106 | A | 2/2000 | Ishii | |
| 6,047,134 | A | 4/2000 | Sekine et al. | |
| 6,055,323 | A | 4/2000 | Okumura | |
| 6,144,797 | A | 11/2000 | MacCormack et al. | |
| 6,332,033 | B1 | 12/2001 | Qian | |
| 6,332,038 | B1 | 12/2001 | Funayama et al. | |
| 6,363,159 | B1 | 3/2002 | Rhoads | |
| 6,507,391 | B2 | 1/2003 | Riley et al. | |
| 6,625,316 | B1 | 9/2003 | Maeda | |
| 6,940,545 | B1 | 9/2005 | Ray et al. | |
| 6,944,319 | B1 | 9/2005 | Huang et al. | |
| 7,035,467 | B2 | 4/2006 | Nicponski | |
| 7,134,130 | B1 | 11/2006 | Thomas | |
| 7,155,159 | B1 | 12/2006 | Weinblatt et al. | |
| 7,158,177 | B2 | 1/2007 | Kage et al. | |
| 7,203,338 | B2 | 4/2007 | Ramaswamy et al. | |
| 7,466,844 | B2 | 12/2008 | Ramaswamy et al. | |
| 7,609,853 | B2 * | 10/2009 | Ramaswamy et al. | 382/103 |
| 8,194,923 | B2 * | 6/2012 | Ramaswamy et al. | 382/103 |
| 2002/0198762 | A1 | 12/2002 | Donato | |
| 2003/0033600 | A1 | 2/2003 | Cliff et al. | |
| 2004/0220753 | A1 | 11/2004 | Tabe | |
| 2005/0144632 | A1 | 6/2005 | Mears et al. | |
| 2005/0198661 | A1 | 9/2005 | Collins et al. | |
| 2006/0062429 | A1 | 3/2006 | Ramaswamy et al. | |
| 2006/0200841 | A1 | 9/2006 | Ramaswamy et al. | |
| 2008/0091510 | A1 | 4/2008 | Crandall et al. | |
| 2009/0133058 | A1 | 5/2009 | Kouritzin et al. | |
| 2009/0265729 | A1 | 10/2009 | Weinblatt | |
| 2009/0290756 | A1 | 11/2009 | Ramaswamy et al. | |

FOREIGN PATENT DOCUMENTS

| | | |
|---|---|---|
| WO | WO9605571 | 2/1996 |
| WO | WO99/27668 | 6/1999 |
| WO | WO2004/053791 | 6/2004 |
| WO | WO2004054255 | 6/2004 |

OTHER PUBLICATIONS

"Infrared Person Tracking," IBM ECVG, retrieved May 6, 2009 from http://www.research.ibm.com/ecvg/misc/footprint.html, last updated Jun. 12, 2002, 2 pages.

Duda et al., "Pattern Classification and Scene Analysis," Chapter 2, Bayes Decision Theory, Stanford Research Institute, Menlo Park, CA, 1973, 19 pages.

International Preliminary Examining Authority, "International Preliminary Examination Report," issued in connection with PCT Application No. PCT/US02/39625, mailed Apr. 27, 2004, 4 pages.

Qing et al., "Histogram Based Fuzzy C-Mean Algorithm," Zhejiang University, IEEE, 1992, pp. 704-707.

Stephen Wolfram, "Mathematica: A System for Doing Mathematics by Computer," Second Edition, Addison-Wesley Publishing Company, Inc., 1991, pp. 665-667.

"Convex Hull," retrieved from http://www.cse.unsw.edu.au/~lambert/java/3d/ConvexHull.hmtl on Nov. 6, 2002, last modified Nov. 1, 2001, 1 page.

"What is convex hull? What is the convex hull problem?," retrieved Nov. 6, 2002 from http://www.ifor.math.ethz.ch/~fukuda/polyfaq/node13.html, 1 page.

"1.6.2 Convex Hull," retrieved Nov. 6, 2002 from http://www.cs.sunysb.edu/~algorith/files/convex-hull.shtml, 2 pages.

International Searching Authority, "International Search Report," issued in connection with PCT Application No. PCT/US02/39625, mailed Jun. 20, 2003, 5 pages.

Patent Cooperation Treaty, "International Search Report," issued in connection with PCT Application No. PCT/US02/39619, mailed Mar. 11, 2003, 4 pages.

International Preliminary Examining Authority, "Written Opinion," issued in connection with PCT Application No. PCT/US02/39619, mailed Apr. 20, 2004, 5 pages.

International Preliminary Examining Authority, "Written Opinion," issued in connection with PCT Application No. PCT/US02/39619, mailed Aug. 22, 2003, 5 pages.

Patent Cooperation Treaty, "International Preliminary Exam Report," issued in connection with PCT Application No. PCT/US02/39619, completed Jun. 1, 2004, 3 pages.

United States Patent and Trademark Office, "Notice of Allowance and Fee(s) Due," issued in connection with U.S. Appl. No. 10/538,692, mailed Jul. 16, 2009, 17 pages.

United States Patent and Trademark Office, "Office communication," issued in connection with U.S. Appl. No. 10/538,692, mailed Apr. 14, 2009, 10 pages.

United States Patent and Trademark Office, "Office communication," issued in connection with U.S. Appl. No. 11/548,578, mailed Mar. 22, 2007, 8 pages.

(56) References Cited

OTHER PUBLICATIONS

United States Patent and Trademark Office, "Office communication," issued in connection with U.S. Appl. No. 11/548,578, mailed Dec. 14, 2007, 9 pages.

United States Patent and Trademark Office, "Notice of Allowance and Fee(s) Due," issued in connection with U.S. Appl. No. 11/548,578, mailed Sep. 10, 2008, 7 pages.

United States Patent and Trademark Office, "Notice of Allowance and Fee(s) Due," issued in connection with U.S. Appl. No. 10/538,483, mailed Jul. 18, 2006, 10 pages.

United States Patent and Trademark Office, "Notice of Allowance and Fee(s) Due", issued in connection with U.S. Appl. No. 12/533,629, mailed on Jan. 31, 2012, 8 pages.

United States Patent and Trademark Office, "Final Office Action", issued in connection with U.S. Appl. No. 12/533,629, on Oct. 18, 2011, 13 pages.

United States Patent and Trademark Office, "Non-Final Office Action", issued in connection with U.S. Appl. No. 12/533,629, on Apr. 27, 2011, 13 pages.

United States Patent and Trademark Office, "Non-Final Office Action", issued in connection with U.S. Appl. No. 13/459,908, on Jul. 18, 2013, 31 pages.

United States Patent and Trademark Office, "Notice of Allowance and Fee(s) Due", issued in connection with U.S. Appl. No. 13/459,908, on Nov. 22, 2013, 16 pages.

\* cited by examiner

METHODS AND APPARATUS FOR DETECTING A COMPOSITION OF AN AUDIENCE OF AN INFORMATION PRESENTING DEVICE

RELATED APPLICATIONS

This patent arises from a continuation of U.S. patent application Ser. No. 13/459,908, filed Apr. 30, 2012, now U.S. Pat. No. 8,660,308, which is a continuation of U.S. patent application Ser. No. 12/533,629, filed on Jul. 31, 2009, now U.S. Pat. No. 8,194,923, which is a continuation of U.S. patent application Ser. No. 10/538,692, now U.S. Pat. No. 7,609,853, which is a U.S. national stage of International Patent Application Ser. No. PCT/US02/39625, filed Dec. 11, 2002. U.S. patent application Ser. No. 13/459,908, U.S. patent application Ser. No. 12/533,629, U.S. patent application Ser. No. 10/538,692, and International Patent Application Serial No. PCT/US02/39625 are hereby incorporated herein by reference in theirs entireties.

FIELD OF THE DISCLOSURE

This disclosure relates generally to audience demographics measurement and, more particularly, to methods and apparatus for detecting a composition of an audience of an information presenting device.

BACKGROUND

Audience measurement of broadcasted television and/or radio programs has been practiced for many years. Audience measurement devices typically collect two kinds of information from households, namely, tuning information (e.g., information indicating the content presented to the audience such as channel information, time of consumption information, program information, etc.) and people information (e.g., information about the demographics of the audience). These two types of information are combined to produce meaningful ratings data.

People information has historically been gathered by people meters. People meters have been constructed in many different manners. For example, some people meters are active devices which seek to determine the composition of the audience by, for instance, analyzing visual images of the audience to actively determine the identity of the people in the audience. Such active determination involves comparing facial features of an individual appearing in a captured image to one or more previously stored facial feature images to search for a match. Other people meters are passive devices which prompt the members of the viewing audience to identify themselves by logging themselves in at specific times. These specific prompting times can be independent of the tuning information and at fixed time intervals (i.e., time-based prompting) or they can be tied to the tuning information and be performed, for example, when the channel changes (i.e., channel change-based prompting).

The time-based prompting technique poses a danger of under sampling or over sampling the data. For example, if the prompts are spaced too far apart in time, audience members may enter or leave the room between prompts. If the audience does not notify the people meter of such entrances/exits, audience composition data and audience change timing is lost. Alternatively, if the time prompts are spaced too closely in time, the audience members may become annoyed and/or reduce their compliance with the prompt requests. Again, audience composition data is lost in such circumstances.

The channel change-based prompting technique discussed above poses the danger of over sampling the data. As explained above, such overly frequent prompting may cause irritation and/or result in a decrease in compliance and a corresponding loss of data collection and/or invalid data.

DETAILED DESCRIPTION

Figure 1:
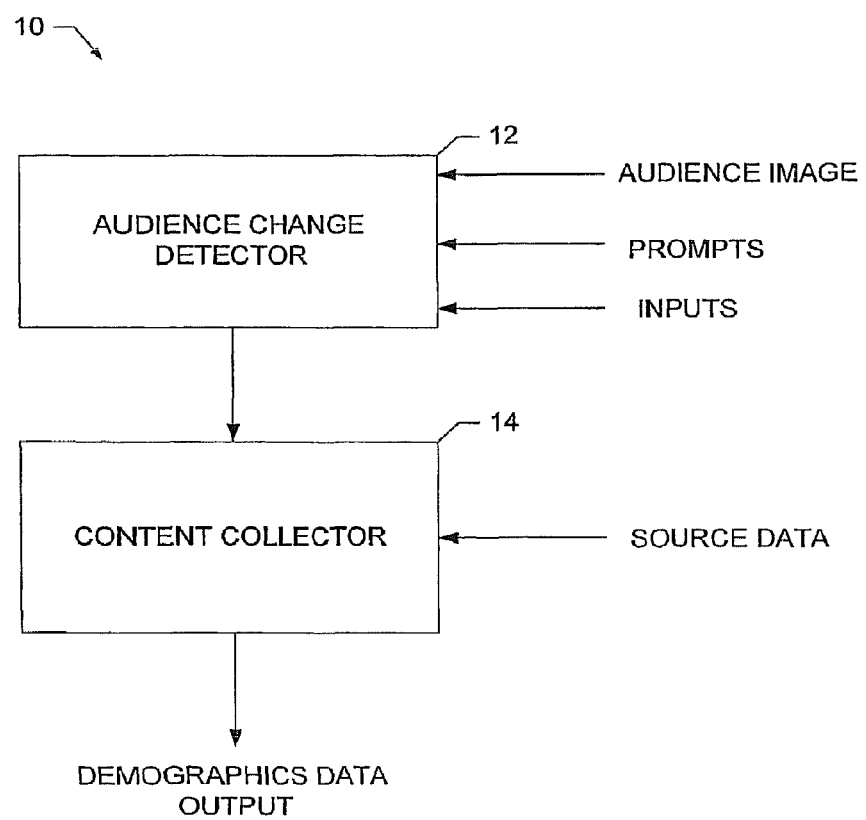
FIG. 1 is a schematic illustration of an example apparatus constructed in accordance with the teachings of the invention.

FIG. 1 is a schematic illustration of an example apparatus 10 for detecting a composition of an audience of an information presenting device (not shown). The information presenting device may be, for example, a television and the audience may be, for example, a statistically sampled household selected to develop television ratings data. Alternatively, the information presenting device may be a personal video recorder, a computer monitor, a radio with or without a visual display, or any other communication device designed to present information for consumption by one or more individuals. Similarly, the audience can be made up of any group of one or more individuals. For example, the group need not be selected via statistical sampling or any other technique. In the following, it is further assumed that demographic information (e.g., age, sex, ethnic background, income level, education level, etc.) concerning each of the expected audience members has been collected and stored in association with unique expected audience member names or pseudo names in a conventional fashion. As a result, when the apparatus 10 obtains the name(s) or pseudo name(s) of the audience member(s), it has also effectively obtained the demographic composition of the audience.

As shown in FIG. 1, the apparatus 10 includes an audience change detector 12 and a content collector 14. The audience change detector 12 captures one or more images of the audience; determines a number of people within the image(s); and prompts the audience to identify its members if a change in the number of people in the audience is visually detected. The content collector 14 monitors source data to identify a program being consumed (e.g., viewed, listened to, etc.) by the audience. Persons of ordinary skill in the art will readily appreciate that any known technique can be utilized to identify the program being consumed. For example, the content collector 14 may identify a consumption time and a source of the program being consumed by the audience. The consumption time and the source identification data may be utilized to identify the program by, for example, cross-referencing a program guide configured, for example, as a look up table. The source identification data may, for example, be the identity of a tuned channel (e.g., channel 3) obtained, for example, by monitoring the tuner of the information presenting device. The source data and the consumption time may be recorded for later use in identifying the program either locally or remotely following exportation of the data, and/or the source data and the consumption time may be utilized immediately for on-the-fly program identification.

Alternatively or additionally, in the visual presentation context (e.g., television viewing), codes embedded in the vertical blanking interval of the program being viewed may be utilized by the content collector 14 to positively identify the program being consumed by the audience.

Figure 2:
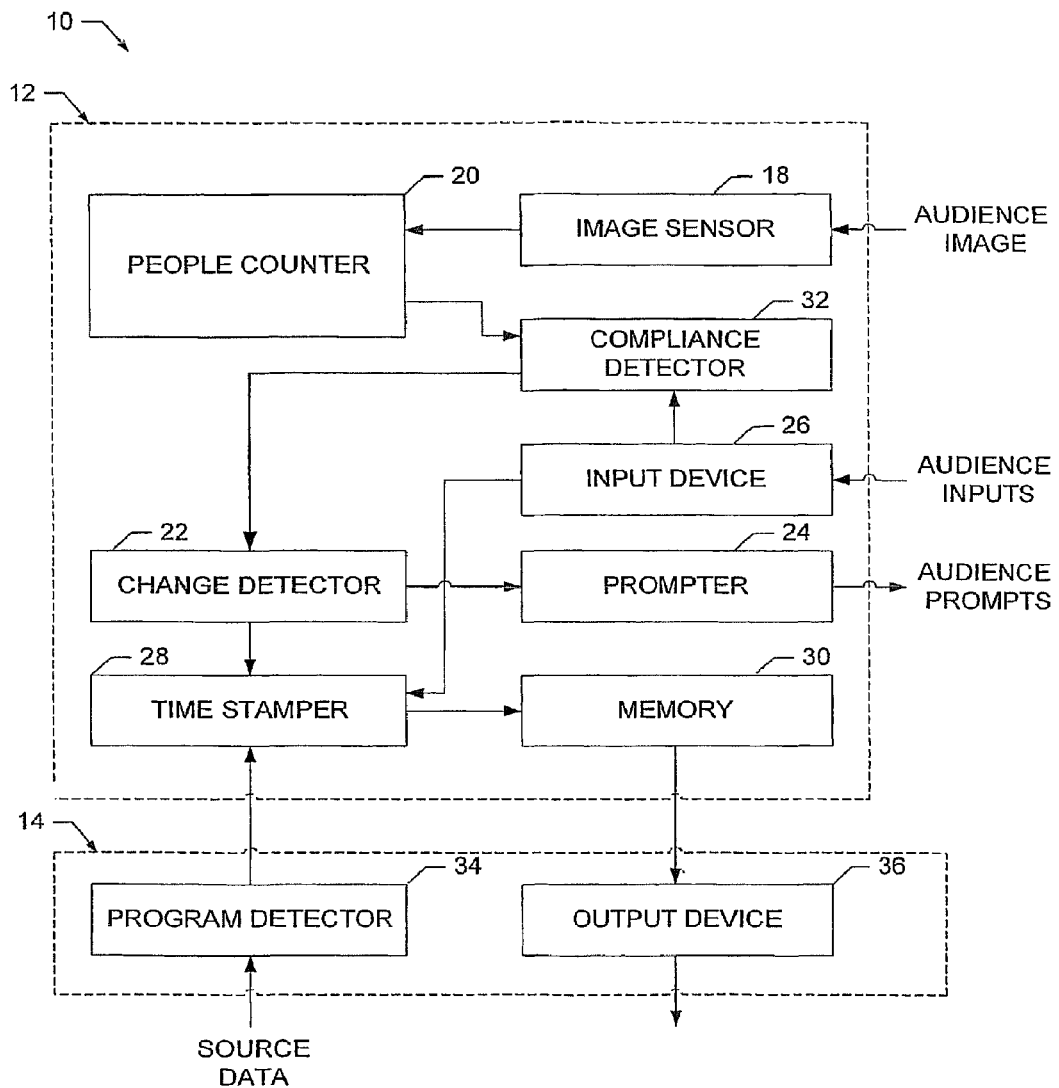
FIG. 2 is a more detailed schematic illustration of the example apparatus of FIG. 1.

A detailed illustration of an example implementation of the apparatus 10 is shown in FIG. 2. As shown in FIG. 2, the audience change detector 12 of FIG. 2 includes an image sensor 18 to capture images of the audience consuming the program(s) presented on the information presentation device. Images are preferably only captured when the information presenting device is in an "on" state. The image sensor 18 may be implemented in any known way. For example, it may be implemented by an infrared imager, or a digital camera such as a charge-coupled device CCD camera.

For the purpose of determining a number of people appearing in the images captured by the image sensor 18, the audience change detector 12 of the apparatus 10 is further provided with a people counter 20. The people counter 20 may determine the number of people within the image(s) in many different ways. However, a preferred method identifies people within the image(s) by detecting changes indicative of movement between successive images. An example people counter 20 and an example manner of implementing the same are discussed below in connection with FIGS. 5-8.

In order to determine if the number of audience members has changed, the audience change detector 12 is further provided with a change detector 22. The change detector 22 compares the number of people counted in the image(s) by the people counter 20 to a value representative of a previous number of people in the audience. The value representative of the previous audience count may, for example, be the audience count the people counter 20 developed in analyzing the last image or set of images, or, in, for example, the case of the first audience image analysis (e.g., the first image(s) collected after a power-up event), it may be a default value (e.g., 0). If a difference exists between the audience count developed by the people counter 20 and the previous number of people in the audience, the change detector 22 develops an output signal indicating an audience composition change has been detected.

As shown in FIG. 2, the audience change detector 12 includes a prompter 24 which is responsive to the output signal developed by the change detector 22 to request the audience to identify its members. If the change detector 22 identifies a difference between the number of people in the image(s) and the value representative of the previous number of people in the audience, the prompter 24 outputs a signal to the audience prompting the audience to identify the individual(s) in the room and/or to identify any individual(s) that have entered or left the room. The signal can be any type of human perceptible signal. For example, the prompter 24 may be implemented by a visual display and the signal output by the prompter 24 may be a viewable request. For instance, the visual display may be the television screen or a separate, dedicated display device and the visual signal may be a menu requesting the audience to identify the current audience member(s) (or alternatively any newly departed and/or newly added audience member(s)) from a list of predetermined possible members. Alternatively, the prompter 24 may be a flashing light or an audible sound providing a sensible signal to the audience that an audience count change has been detected.

Regardless of the type of signal employed (e.g., visual, audible, etc.), in the illustrated example the people counter 20, the change detector 22 and the prompter 24 cooperate to prompt the audience member(s) to log themselves(s) in whenever a change in the number of audience members occurs. As a result, the audience is neither oversampled (i.e., prompted excessively), nor undersampled (i.e., prompted too infrequently such that audience change times are missed). Also, in the event all audience members leave the room, the apparatus 10 automatically detects and records that there is no audience members, thereby collecting accurate audience measurement data even when no audience member is present to respond to a prompt.

In order to receive data from the audience member(s), the audience change detector 12 is further provided with an input device 26 such as a conventional IR transmit-receive pair, a mouse, a keyboard, a touchscreen, a touchpad, a microphone and voice recognition engine, and/or any other means of inputting data into a computing device. In the example shown in the figures, the input device 26 is an IR receiver and the audience is provided with one or more conventional IR transmitters for remotely entering data into the apparatus 10.

As also shown in FIG. 2, the audience change detector 12 includes a time stamper 28 and a memory 30. The time stamper 28 includes a conventional clock and calendar, and functions to associate a time and date with recorded events. For example, if the change detector 22 detects a change in the audience count, it outputs the counted number of audience members to the time stamper 28 and/or the memory 30. The time stamper 28 then associates a time and date with the new audience count by, for example, appending the time/date data to the end of the audience count. The complete data package (i.e., audience count, time and date) is stored in the memory 30. Similarly, whenever data such as, for example, the identity of an audience member is entered via the input device 26, the time stamper 28 associates a time and date with the data. The memory 30 stores the entered data, time and date for later analysis.

For the purpose of determining if one or more members of the audience is not being identified in response to a prompt from the prompter 24, the audience change detector 12 is further provided with a compliance detector 32. As shown in FIG. 2, the compliance detector 32 monitors the inputs from the audience and compares them to the audience count developed by the people counter 20. If a number of members identified by the audience via the input device 26 is different from the determined number of people after a predetermined number of prompts of the audience, the change detector 22 causes the difference between the number of members identified by the audience and the number of people determined from the image(s) by the people counter 20 to be recorded in the memory 30 as a number of unidentified audience members. The time stamper 28 ensures the records indicative of the presence of the unidentified audience member(s) is time stamped and dated, as explained above.

In the event such unidentified audience member(s) are detected, the compliance detector 32 adjusts a value representative of the previous number of people in the audience by a difference between the number of members identified by the audience and the number of people determined from the image(s) by the people counter 20 to avoid excessive prompting of the audience. In other words, the value indicative of the last audience count made by the people counter 20 is adjusted so that, assuming the audience composition does not change in the interim, at the next image collection and evaluation by the people counter 20, the change detector 22 will compare the audience count developed by the people counter 20 to an audience count which includes the unidentified audience member(s). Therefore, since in this example, no change in the number of audience members has occurred, the change detector 22 will not detect a change and the prompter 24 will not prompt the audience even though the unidentified audience member(s) are present. As a result, the compliance detector 32 functions to avoid excessively prompting the audience if an audience member is refusing to identify himself/herself.

In the example of FIG. 2, the content collector 14 includes a program detector 34 and an output device 36. The program detector 34 monitors source data to determine the source of the program being consumed by the audience. For example, the program detector 34 may monitor the tuner of the information presenting device (e.g., a television) to determine which channel is currently tuned (e.g., a television program on channel 3 is being viewed). Alternatively or additionally, the program detector 34 may monitor a video screen of the information presenting device to determine if a visual source identification signal is present during one or more vertical blanking intervals of the program being consumed. Alternatively or additionally, the program detector 34 may monitor an audio output of the information presenting device to determine if an audio source identification signal is present in the program being consumed. Irrespective of how the data is gathered, the detected source information is time stamped by the time stamper 28 and stored in the memory 30 for subsequent analysis.

In the example of FIG. 2, the output device 36 periodically exports the recorded data from the memory 30 to a remote data analysis computer (not shown) via a network such as the Internet or the like. The data analysis computer identifies audiences (e.g., the individual(s) comprising an audience and, thus, the demographic composition of the audience) and the programs, or parts of programs, those audiences consumed. This analysis can be performed, for example, by cross-referencing the recorded time, date and source data for the subject audiences to a program guide. Alternatively, the data analysis could be performed locally and exported via a network or the like to a data collection computer for further processing. In either event, the data collection computer typically assembles data from multiple different households to develop ratings data. No images are transmitted or extracted from the apparatus 10 under either the local analysis or remote analysis model. The exportation of data can be done through a wired or wireless connection.

Figure 3:
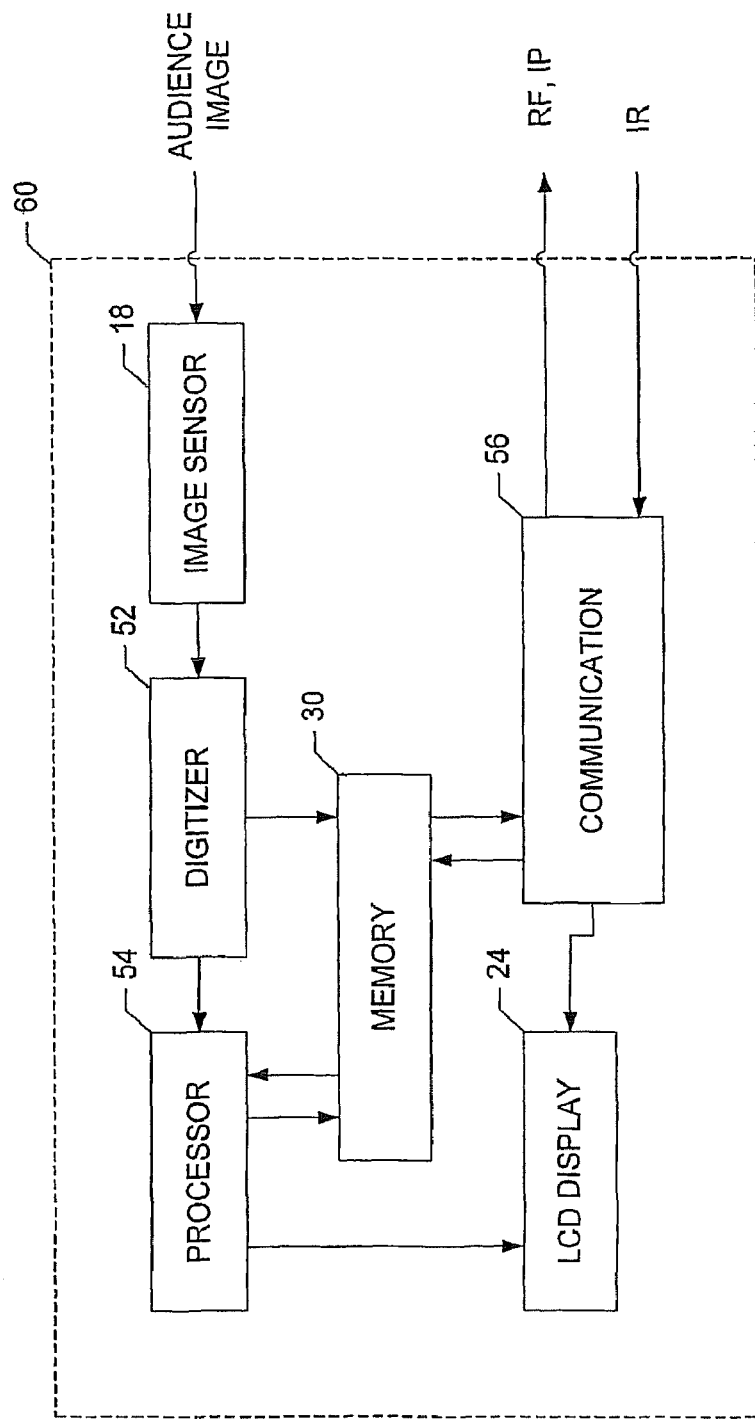
FIG. 3 is a schematic illustration of an example implementation of the apparatus of FIGS. 1-2.

An example apparatus 60 for implementing the apparatus 10 of FIGS. 1-2 is shown in FIG. 3. The apparatus 10 of FIG. 3 includes an image sensor 18 such as an analog camera and a digitizer 52 for digitizing the analog image(s) captured by the image sensor 18 into digital data. The image sensor 18 and digitizer 52 may alternatively be implemented by a single device such as a digital camera.

The apparatus 50 of the instant example includes a processor 54. For example, the processor 54 may be implemented by one or more Intel® microprocessors from the Pentium® family, the Itanium™ family or the XScale™ family. Of course, other processors from other families are also appropriate.

As is conventional, the processor 54 is in communication with a main memory 30 via a bus. The memory 30 stores the data developed by the apparatus 10. It also stores computer readable instructions which, when executed, cause the processor 54 to determine a number of people within the image(s) captured by the sensor 18, and to develop a prompt signal requesting the audience to identify its member(s) if a change in the number of people in the audience is visually detected The memory 30 may include a volatile memory and a non-volatile memory. The volatile memory may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory may be implemented by flash memory and/or any other desired type of memory device. Access to the main memory 30 may be controlled by a memory controller (not shown) in a conventional manner.

The memory 30 may also include one or more mass storage devices for storing software and data. Examples of such mass storage devices include floppy disk drives, hard drive disks, compact disk drives and digital versatile disk (DVD) drives.

The apparatus 50 also includes a communication block or interface circuit 56. The interface circuit 56 may be implemented by any type of well known interface standard, such as an Ethernet interface, a universal serial bus (USB), and/or a third generation input/output (3GIO) interface.

One or more input devices 56 are included in or connected to the interface circuit 56. The input device(s) permit a user to enter data and commands into the processor 54. The input device(s) can be implemented by, for example, an IR transmit/receive pair, a keyboard, a mouse, a touchscreen, a trackpad, a trackball, isopoint and/or a voice recognition system.

An output device 24 is also connected to the interface circuit 56. The output device 24 is responsive to the prompt signal output by the processor 54 to output an indication requesting the audience to identify its members. In the example of FIG. 3, the output device 24 is a liquid crystal display (LCD) which outputs a visually perceptible prompt signal. However, the output device 24 may additionally or alternatively be implemented by, for example, other visual and/or audible display devices (e.g., a cathode ray tube (CRT) display, a printer and/or speakers).

The interface circuit 56 also includes a communication device such as a modem or network interface card to facilitate exchange of data with external computers via a network (e.g., an Ethernet connection, a digital subscriber line (DSL), a telephone line, coaxial cable, a cellular telephone system, etc.). It may also include a communication device such as an infrared decoder to receive and decode IR signals transmitted to the apparatus 60 by one or more audience members An example software program for implementing the apparatus of FIGS. 1-2, is shown in FIGS. 4A-4D. In this example, the program is for execution by a processor such as the processor 54 shown in the example of FIG. 3, and the program is embodied in software stored on a tangible medium such as a compact disk (CD), a floppy disk, a hard drive, a digital versatile disk (DVD), or a memory associated with the processor 54. However, persons of ordinary skill in the art will readily appreciate that the entire program or parts thereof could alternatively be executed by a device other than the processor 54 and/or embodied in firmware or dedicated hardware in a well known manner. For example, any or all of the people counter 20, the change detector 22, the time stamper 28, the program detector 34, and/or the compliance detector 32 could be implemented by software, hardware, and/or firmware. Further, although the example program is described with reference to the flowchart illustrated in FIGS. 4A-4D, persons of ordinary skill in the art will readily appreciate that many other methods of implementing the example apparatus 10 may alternatively be used. For example, the order of execution of the blocks may be changed, and/or some of the blocks described may be changed, eliminated, and/or combined.

Figure 4A:
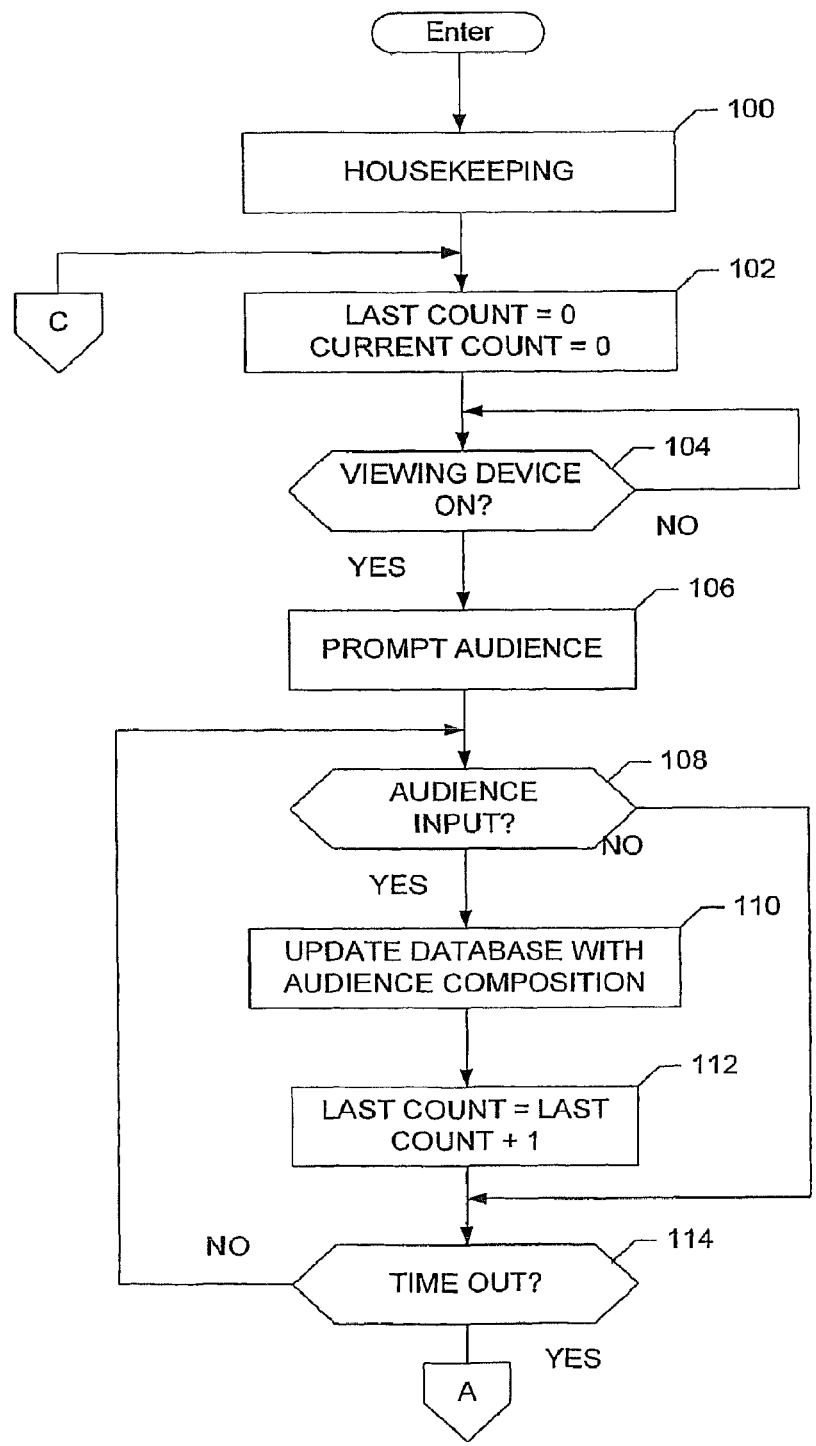
FIGS. 4A-4D are a flow chart illustrating example machine readable instructions which may be executed by the apparatus of FIG. 3 to implement the apparatus of FIGS. 1-2.

In the example of FIG. 4A, the program starts at power up when the processor 54 engages in various conventional housekeeping tasks such as initializing the memory, etc. (block 100). The people counter 20 then resets the variables LAST COUNT and CURRENT COUNT to zero (block 102). The processor 54 then determined whether the information presenting device (in this example, a viewing device such as a television) is in an on state (block 104). If the information presenting device is in an off state, the processor 54 enters a wait loop until the information presenting device is turned on. No audience images are collected unless the information presenting device is in an "on" state.

Assuming the information presenting device is in an on state, the people prompter 24 is driven to prompt the audience to identify its member(s) (block 106). The apparatus 60 then awaits an input from the audience (block 108). When an audience input is received via, for example, the input device 26 (block 108), the processor 54 updates the database with the input data (e.g., an audience member's identity) (block 110). The time stamper 28 may record a time and date in association with the input data. The people counter 20 then increments the LAST COUNT variable to reflect the presence of the audience member that identified himself/herself (block 112).

The processor 54 then determines if a predetermined length of time (e.g., 10 seconds) has elapsed since the last input was received from the audience (block 114). If the predetermined time has not elapsed (block 114), control returns to block 108 where the processor 54 determines if another audience input has been received. If not, control again proceeds to block 114. Otherwise control advances to block 110 where the database stored in the memory 30 is updated to reflect the new audience data input. Control continues to loop through blocks 108-114 until no audience inputs are received for the predetermined length of time (block 114), at which point it is assumed that all audience members have identified themselves (although this assumption is tested at block 146 as explained below).

Assuming the predetermined length of time has elapsed without any further audience inputs (block 114), control proceeds to block 116. At block 116, the program detector 34 identifies the source of the program being presented on the information presenting device. If a change in the source has occurred (e g, tuning changed from channel 3 to channel 11), or if a power on event just occurred (e g, tuning changed from no tuned channel to channel 12) (block 118), the database stored in the memory 30 is updated with the new source information (block 120). As explained above, the time stamper 28 associates a time and date with the new source information. If no source change or turn on event has occurred (block 118), control skips block 120 and proceeds directly to block 122.

At block 122, the image sensor 18 is activated to capture image(s) of the audience. The captured image(s) are digitized (block 124) and passed to the people counter 20. The people counter 20 then analyzes the image(s) to determine if any person is located in the image(s) as explained below in connection with FIGS. 5-8 (block 126). The variable CURRENT COUNT is set to reflect the number of persons in the image(s) (block 128). Control then advances to block 134.

At block 134, the change detector 22 determines if the CURRENT COUNT value (i.e., the number of persons counted in the captured image(s)) is equal to the LAST COUNT value (i.e., the number of persons counted immediately prior to the capturing of the image(s) being analyzed). If the CURRENT COUNT value and the LAST COUNT value are equal (block 134), control returns to block 116 because no audience change has occurred. Otherwise, control proceeds to block 136. Control continues to loop through blocks 116-134 until an audience count change is detected (block 134).

Assuming an audience count change has been detected (block 134), the time stamper 28 updates the database in the memory 30 with an entry indicating the time and date that an audience change occurred (block 136). It then drives the prompter 24 to prompt the audience member(s) to identify themselves(s) (block 138, FIG. 4C). If an audience input is received (block 140), the new data is written to the memory 30 (block 142). If no audience input is received for a predetermined length of time (e.g., 10 seconds) (block 144), control advances to block 146. Otherwise control continues to loop through blocks 140-144 as long as the audience continues to input data.

Assuming that the audience has stopped inputting data (block 144), the compliance detector 32 determines if the number of audience members identified by the inputs received from the audience is equal to the CURRENT COUNT developed from the captured image(s) by the people counter 20 (block 146). If the audience identified less audience members than the people counter 20, then the compliance detector 32 determines whether this discrepancy has occurred a predetermined number of times sequentially (e.g., three times in a row) (block 148). If not, control proceeds to block 150. Otherwise, control advances to block 156 of FIG. 4D.

Assuming for the moment that the number of audience members identified in the inputs received from the audience is equal to the number of individuals counted by the people counter 20, the compliance detector 32 sets the LAST COUNT variable equal to the CURRENT COUNT value (block 150). Setting the LAST COUNT variable in this manner ensures that only changes in the audience count result in audience prompts (see block 134). After the LAST COUNT variable is set (block 150), the CURRENT COUNT variable and the NONCOMPLIANT PERSON COUNT variable are both re-set to zero (block 152).

Figure 4B:
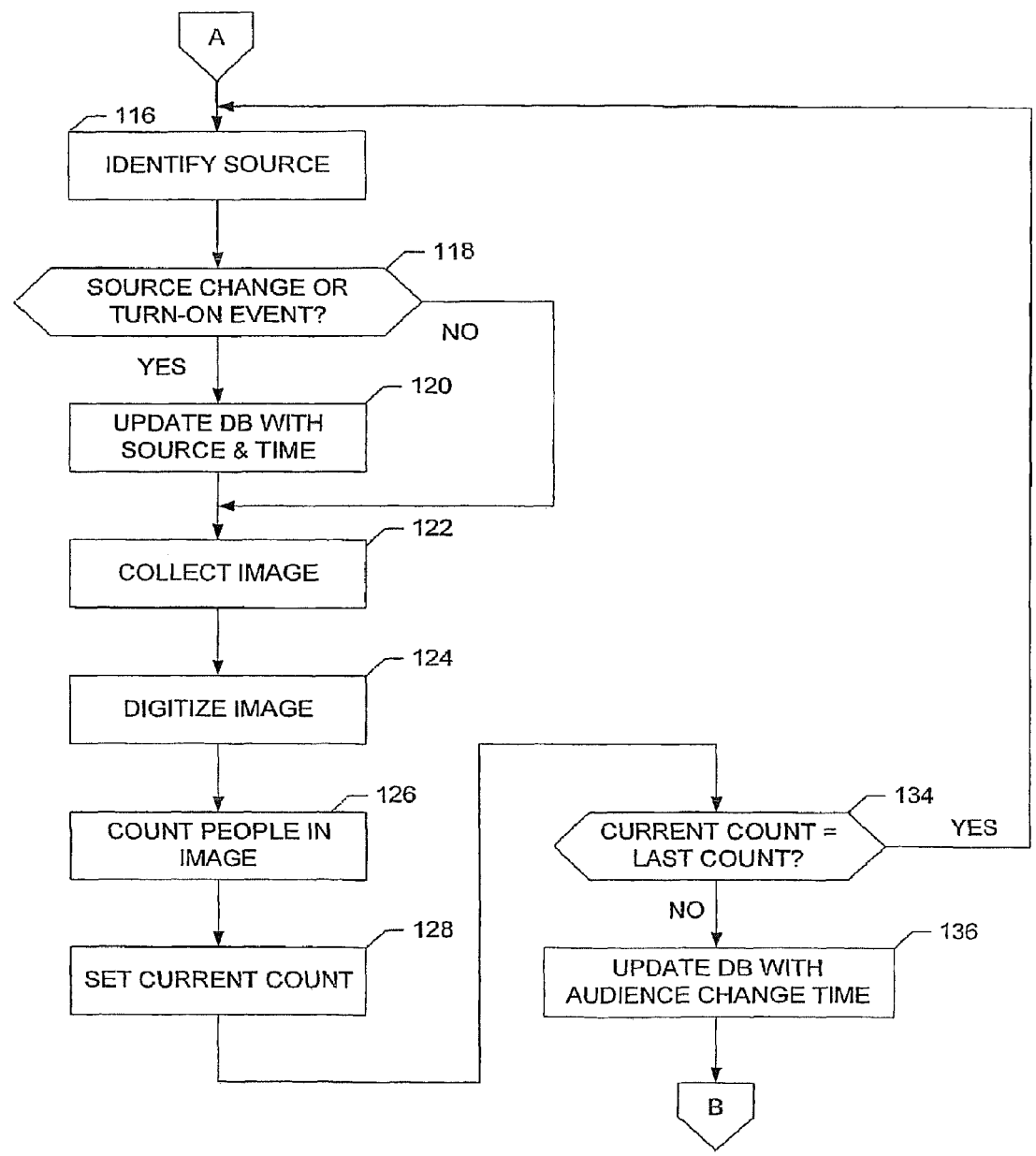
Figure 4C:
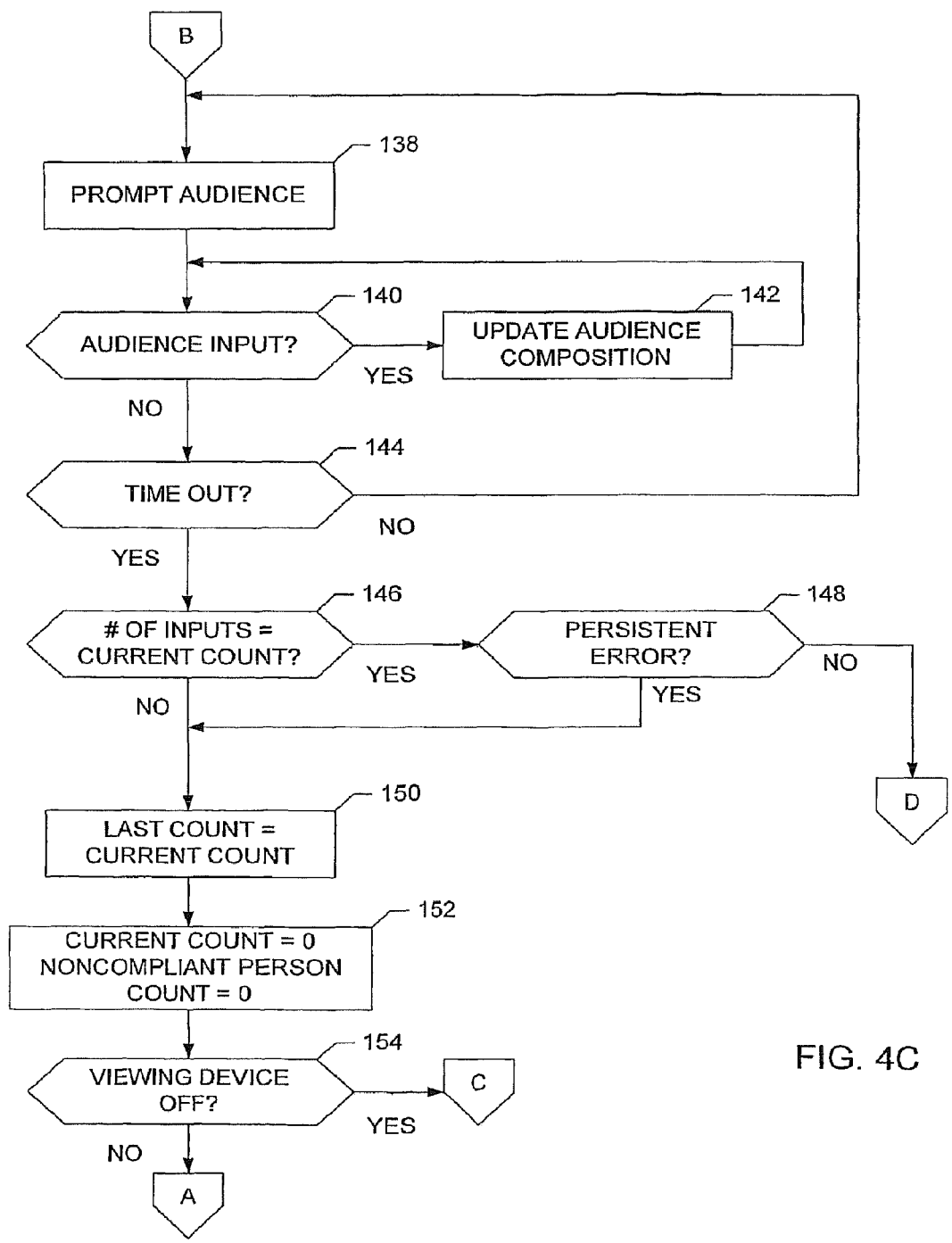

The program detector 34 then verifies that the information presenting device is still in an on state (block 154). If so, control returns to block 116 (FIG. 4B). Control continues to loop through blocks 116-154 until the information presenting device is turned off (block 154), or noncompliant persons are detected a predetermined number of times sequentially (block 148). If the information presenting device is turned off (block 154), control returns to block 102 (FIG. 4A).

Figure 4D:
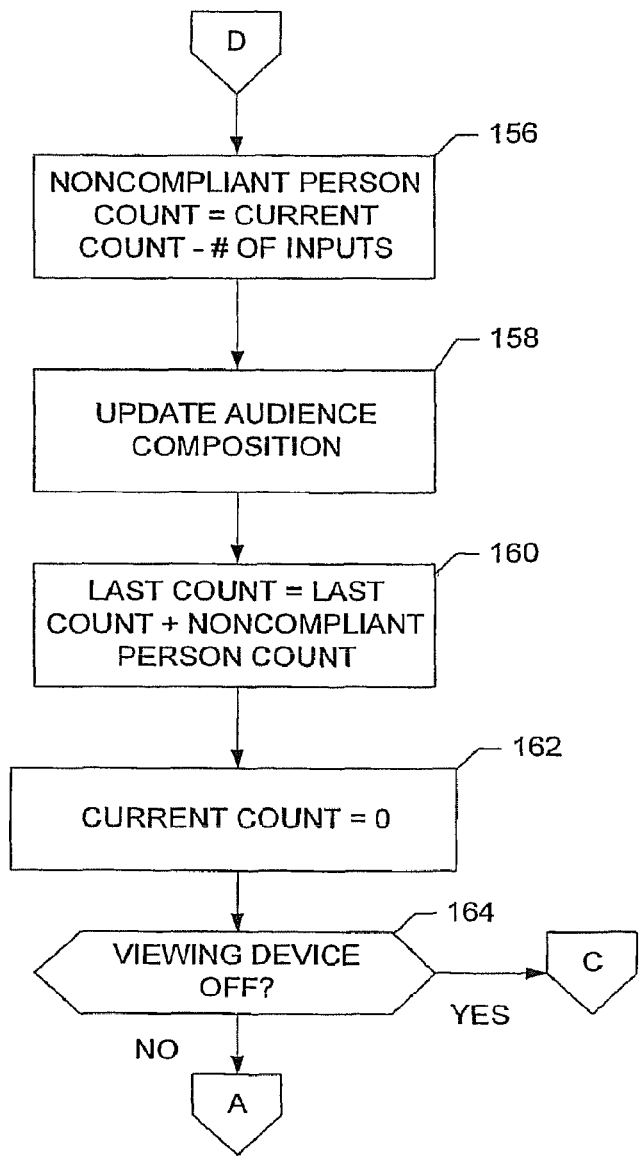

Assuming that at least one audience member refuses to identify himself/herself for the predetermined number of times sequentially (block 148), control advances to block 156 (FIG. 4D). At block 156, the compliance detector 32 calculates the number of unidentified individuals in the audience. In particular, the noncompliance detector 32 sets the NONCOMPLIANT PERSON COUNT variable equal to the value in the CURRENT COUNT variable minus the number of audience members identified by the audience inputs. The NONCOMPLIANT PERSON COUNT is then written to the memory 30 in association with a time and date stamp, thereby recording the number of unidentified persons in the audience (block 158). The variable LAST COUNT is then incremented by the value in the NONCOMPLIANT PERSON COUNT variable (block 160). Adjusting the LAST COUNT variable in this manner avoids repeatedly prompting the audience to identify noncompliant persons.

After re-setting the CURRENT COUNT variable to zero (block 162), the program detector 34 then verifies that the information presenting device is still in an on state (block 164). If so, control returns to block 116 (FIG. 4B). If, on the other hand, the information presenting device is turned off (block 164), control returns to block 102 (FIG. 4A).

Figure 5:
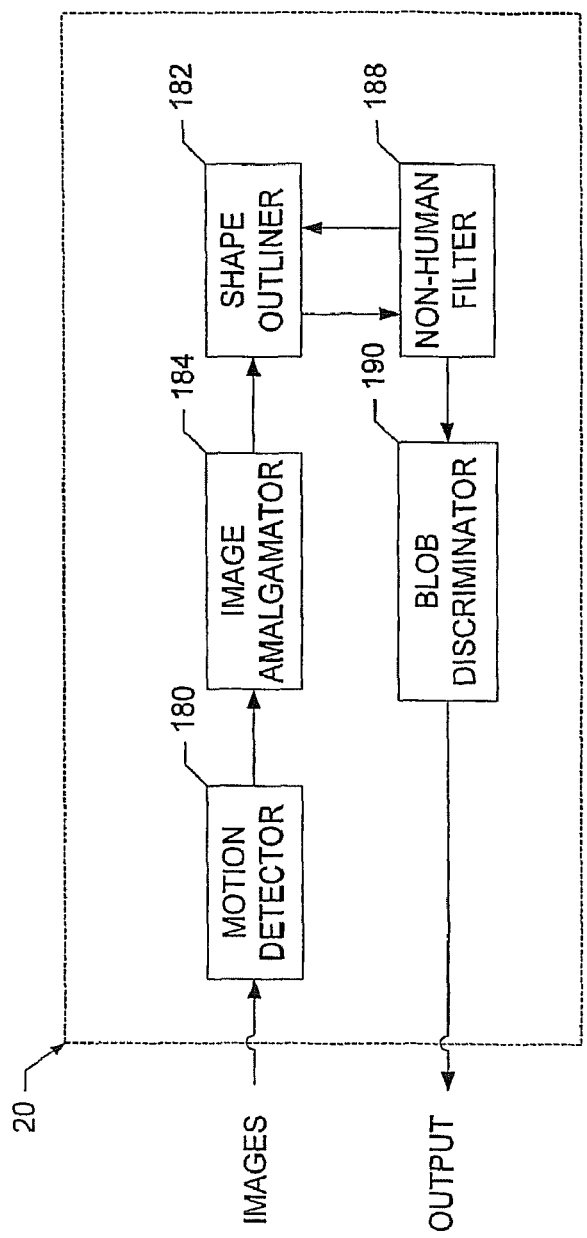
FIG. 5 is a schematic illustration of an example people counter constructed in accordance with the teachings of the invention.

An example people counter 20 is schematically illustrated in FIG. 5. The people counter 20 shown in FIG. 5 includes a motion detector 180. The motion detector 180 receives a sequence of images from the image sensor 18. In the example of FIG. 5, the image sensor 18 captures and provides images to the motion detector 180 at a rate of 15 frames per second, although other rates of capture would likewise be appropriate.

The sequence of images may be digitized when the motion detector 180 receives them, or, alternatively, the motion detector 180 may include a digitizer 52 to convert the images received from the image sensor 18 into digital images. In the example of FIG. 5, the images are digitized such that each pixel in each image is assigned an 8 bit binary value (i.e., a value of 0-255) which is representative of the corresponding image data. Thus, each image can be thought of as an array of digital data with each element contained in the array corresponding to an 8 bit binary value. The number of pixels assigned to each image (i.e., the resolution) can be selected at any desired level. However, the same array size is preferably employed for each image. Additionally, JPEG (or other picture format) copies of the original images may be saved for future reference, if desired.

The motion detector 180 operates on each sequential pair of images received from the image sensor 18 to detect motion occurring between the two images. More specifically, assuming a given room containing an audience is repeatedly photographed to create a series of images as explained above, then if there is no movement for a given time period, there will be no significant difference between two successive images of the room taken during the period of no movement. Thus, the binary values of the elements in the image array for a first image will be identical (or substantially identical if noise errors or the like are present) to the binary values of the corresponding elements in the image array for a second image taken immediately after the first image. If, however, there is movement between the time at which the first image is taken and the time at which the second image is taken, the binary values of the elements in the image array for the second image will be different from the binary values of the corresponding elements in the image array for the second image.

The motion detector 180 takes advantage of this fact to detect differences due to, for example, motion of audience members between successive images received from the image sensor 18 by comparing each successive pair of images on an element by element basis. In particular, the motion detector 180 develops a difference image corresponding to each pair of successively received images by subtracting the corresponding elements of one image array from the other image array. In an extremely simplified example wherein each digitized image is an array of four elements, assuming that the elements of a first received image have the following values (90, 103, 23, and 203), and the corresponding elements of a second received image have the following values (90, 103, 60 and 250), then the difference image computed by the motion detector is an array of four elements having the following values (0, 0,−37,−47). In this example, there has been motion between the first and second image and, thus, some of the values in the difference image are non-zero. The non-zero values represent points of motion. If there is no difference between successive images, all the values in the difference image corresponding to those two successive images will be zero (or substantially zero as some small differences may appear due to noise or other error).

From the foregoing, persons of ordinary skill in the art will appreciate that each difference image is typically a collection of motion points localized around center(s) of motion. In order to correlate these motion points to objects in the images, the people counter 20 is further provided with a shape outliner 182. The shape outliner 182 employs a process such as the well known convex hull algorithm to draw shapes or blobs encompassing the motion points. As is well known by persons of ordinary skill in the art, the convex hull algorithm joins all points in a set of points that satisfy a predetermined constraint into a blob or shape. The predetermined constraint may be a requirement that all of the points in the blob or shape are separated by less than a predetermined distance. Since in this example, we are attempting to identify humans, the predetermined distance should be a distance corresponding to the size of a human being. This distance may be a settable or programmable parameter and may be set based on the sizes of the expected audience members at a given household.

Since there may not be enough data points in a difference image for the shape outliner 182 to draw meaningful shapes, the people counter 180 is further provided with an image amalgamator 184. For each image for which the people counter 20 is requested to develop a people count, the image amalgamator 184 integrates or otherwise smoothes or filters the difference images from a time interval in which the image to be analyzed is located into a single amalgamated image. For example, if the image to be analyzed occurs at time i, the image amalgamator 184 will combine the difference images from a time interval beginning at time i-k and ending at time i+c into a single image array, where k and c are preferably equal, but may be different. The difference images may be combined into an amalgamated image by summing the array corresponding to the difference images on an element by element basis and then dividing each summed element by the number of elements summed (i.e., the number of difference images). Thus, like the arrays corresponding to the difference images, the amalgamated image is an array of 8 bit binary values (i.e., values ranging from 0 to 255).

As shown in FIG. 5, rather than acting directly on the difference images, the shape outliner 182 operates on the amalgamated image corresponding to an image being analyzed to draw blob(s) within the amalgamated image via the process explained above. Operating on the amalgamated images rather than directly on the difference images integrates or averages error over a fixed time interval, which has a tendency to reduce the size of noise objects that could be interpreted as motion relative to objects that are representative of actual motion.

From the foregoing, persons of ordinary skill in the art will appreciate that the motion detector 180, the image amalgamator 184 and the shape outliner 182 function to reduce the problem of counting people appearing in an image to counting blob(s) reflecting center(s) of motion within an image.

For the purpose of discriminating human blob(s) appearing within the amalgamated image from non-human blob(s) (e.g., pets, random noise, inanimate objects, etc.), the people counter 20 may optionally be further provided with a non-human filter 188. In the illustrated example, the non-human filter 188 analyzes the shape(s) drawn within the amalgamated image by the shape outliner 182 to determine if any can be eliminated from the amalgamated image as not possibly corresponding to a human being. The non-human filter 188 may employ any logical test to eliminate blob(s) from the amalgamated image. For example, the non-human filter 188 may test the location(s) of the blob(s) to determine if their location(s) identify them as not human. For instance, a blob located on the ceiling of a room can be eliminated as not human. In addition to location based tests, the non-human filter 188 may also test the size of the shape. For example, if the size of a blob is beneath a certain threshold or above a certain threshold, it may be eliminated as not reflecting a human sized object. The tests performed by the non-human filter 188 may be adjusted to suit the household being analyzed. For example, in a household with children, the non-human filter 188 may employ a lower size threshold than a household with no children. Similarly, in a household with no children, the non-human filter 188 may identify blob(s) appearing on the floor as non-human, whereas is may not be allowed to identify blob(s) on the floor as non-human based purely on a floor location if the household includes children. If the test(s) employed by the non-human filter 188 are to be tailored to the demographics of the household being analyzed, the test(s) should be adjusted at set up of the apparatus 20.

The non-human filter 188 may eliminate a blob from the amalgamated image in many different ways. For example, the binary values in the amalgamated image giving rise to the object being eliminated can be zeroed, and the revised amalgamated image fed back to the shape outliner 182 to create a new set of blob(s) in the amalgamated image excluding the blob(s) eliminated by the non-human filter 188.

For the purpose of determining if any of the blob(s) appearing in the amalgamated image (optionally, as filtered by the non-human filter 188) represents a person, the people counter 20 is further provided with a blob discriminator 190. Were one to simply count the number of blobs appearing in the amalgamated image (optionally as filtered by the non-human filter 188), false people counts might result in certain instances. For example, if two people are located in an audience, but only one of those people moves during a time period being analyzed, only one blob will appear in the amalgamated image, and simply counting blobs without further refinement would result in an undercount. By way of another example, if two audience members move in a symmetrical fashion for a given period of time, they could potentially appear as a single blob in the amalgamated image. Simply counting blobs in this scenario will again result in an undercount. The blob discriminator 190 solves this potential problem by ensuring only blob(s) that exhibit persistent motion over a time period of interest are counted as persons.

To perform the persistent motion test, the blob discriminator 190 does not develop a count of the blobs appearing in every amalgamated image. Instead, a number of sequential amalgamated images are analyzed over a period of time. In particular, for each amalgamated image, the blob(s) contained therein are represented by symbols in a histogram. Although a blob can appear only once in any given amalgamated image, if the blob exhibits persistent motion, it will appear in multiple different amalgamated images. For every time a blob appears in an amalgamated image and meets the convex hull criteria, a symbol is added to the histogram. Therefore, the histogram tracks the number of times each blob exhibits motion over a period of time. After that period of time, the histogram is analyzed and only those blobs that have exhibited sufficient persistence of motion as indicated by the number of times a symbol corresponding to that blob appears in the histogram, are identified as persons.

Figure 6:
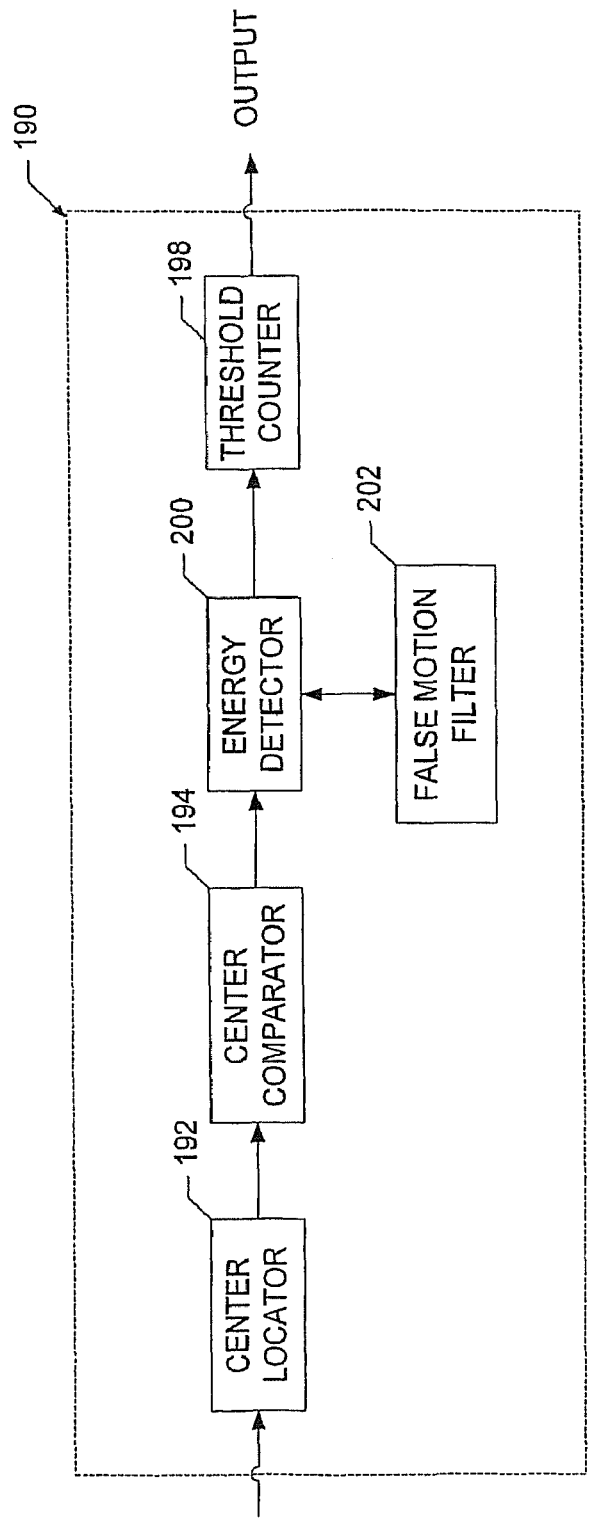
FIG. 6 is a schematic illustration of an example blob discriminator.

An example blob discriminator 190 is shown in FIG. 6. For the purpose of identifying the center of gravity of the blob(s) appearing in the amalgamated image, the blob discriminator 190 is provided with a center locator 192. In the illustrated example, the center locator 192 computes the center of gravity of each blob in the amalgamated image by assigning a value to a plurality of points in the blob. The value assigned to a given point corresponds to the X-axis location of the given point in the amalgamated image. The X-axis may, for example, correspond to the field of view of the image sensor. Once these point values are assigned, the center locator 192 averages the values. The average X-axis value computed by the center locator 192 corresponds to the X-axis position of the center of gravity of the blob in question. The computed center of gravity is then added to the histogram which is used to test the persistence of the motion of each identified blob as explained above.

In order to add a symbol which is representative of the center of gravity of the blob to the histogram, the blob discriminator 190 is further provided with a center comparator 194. The center comparator 194 serves a gravitation function. In particular, whenever the center locator 192 computes a center of gravity of a blob, the center comparator 194 compares the newly computed center of gravity to the existing centers of gravity already appearing in the histogram. If the newly computed center of gravity is the same as, or falls within a predetermined distance of, a center of gravity already represented in the histogram, it is assumed that the newly computed center represents the same object as the existing center. As a result, a symbol representative of the newly computed center is added to the symbol representing the existing center in the histogram. Preferably, every symbol added to the histogram has the same size. Therefore, when a symbol is added to one or more existing symbols in the histogram, the existing symbol "grows" in size.

Persons of ordinary skill in the art will readily appreciate that a histogram such as that described above may be implemented in many different ways. For example, it may be implemented graphically wherein symbol(s) of the same size are placed at the X-axis location of their corresponding blob(s). If two or more symbols have substantially the same X-axis location (thereby exhibiting some level of persistent motion of their corresponding object), they are stacked vertically. Alternatively, a horizontal growth metric may be used. Alternatively or additionally, the histogram could be implemented by a set of counters wherein each counter in the set corresponds to an X-axis location within an amalgamated image. If a blob having a center of gravity corresponding to the X-axis location of a given counter is identified in an amalgamated image, the corresponding counter is incremented. Therefore, the larger the number of times a blob appears in a series of amalgamated images, the larger the value in the corresponding counter becomes.

To determine whether any symbol in the histogram has exhibited sufficient persistent motion to be counted as a person in the audience, the blob discriminator 190 is further provided with a threshold counter 198. The threshold counter 198 compares the number of times each center of gravity is represented in the histogram to a predetermined threshold. This can be done, for example, by comparing the size of the symbol to the predetermined threshold. If any symbol in the histogram has a size greater than the threshold, it is counted as a person. Thus, in the example of FIGS. 1-4, the CURRENT COUNT variable is incremented one time for every symbol having a size that exceeds the predetermined threshold.

In the people counter 20 of FIGS. 5-6, a histogram and, thus, a people count, is not developed for every possible sequence of amalgamated images. Instead, a histogram is made only when there is sufficient motion in the room being monitored to suggest that an audience composition change may be occurring (e.g., someone walking into or out of a room appears as a large amount of motion compared to an audience sitting in front of an information device). To determine when to develop and analyze a histogram, the blob discriminator 190 is further provided with an energy detector 200. For each difference image developed by the motion detector 180, the energy detector 200 computes an energy value. In the illustrated example, the energy value is computed by squaring each array representing a difference image and summing the values corresponding to the elements in the squared array. If the summed value exceeds a predetermined energy threshold, the difference image has a corresponding energy level that suggests an audience change may be occurring. Therefore, whenever a difference image that exceeds the energy threshold is detected by the energy detector 200, the energy detector 200 sets a motion marker in association with that difference image.

The people counts developed at the motion markers can be extrapolated to the periods occurring between motion markers. This extrapolation is possible because there is relatively little motion between the motion markers. Someone entering or leaving the audience room is associated with a significant amount of motion. Since motion markers are set when such a significant amount of motion occurs, no significant amount of motion occurs between motion markers, and it can, thus, be safely assumed that no one has left or entered the room in the time between motion markers. Therefore, it can be safely assumed that the audience composition has not changed in the time between motion markers. By way of an example, if at a first motion marker the people counter 20 determines there are 2 people in the audience, and at the next motion marker the people counter determines there are three people in the room, then, because no motion indicating a person has entered or exited the room is detected prior to the second motion marker, the people count for the entire period from the first motion marker to the second motion marker is two people.

When sufficient data has been developed around a motion marker (e.g., when enough amalgamated images prior to and after a motion marker have been analyzed for the corresponding histogram developed from those amalgamated images to have meaning, the threshold counter 198 is activated. As explained above, the threshold counter 198 determines whether any blob represented in the histogram has exhibited sufficient persistence of motion to be counted as a person. Any such blob is counted as a person and the person count so developed is output by the people counter 20.

To prevent noise and false motions from cluttering the histogram, the blob discriminator 190 is further provided with a false motion filter 202. The false motion detector 202 of the illustrated example reviews the symbols recorded in the histogram as the histogram is being developed. If any symbol does not grow for a predetermined amount of time (e.g., three minutes), the symbol is assumed to be noise or other false motion and is eliminated from the histogram. In this way, erroneous entries due to noise, random movement, or erroneous consolidation of two or more blobs into one blob are not allowed to grow.

Figure 7A:
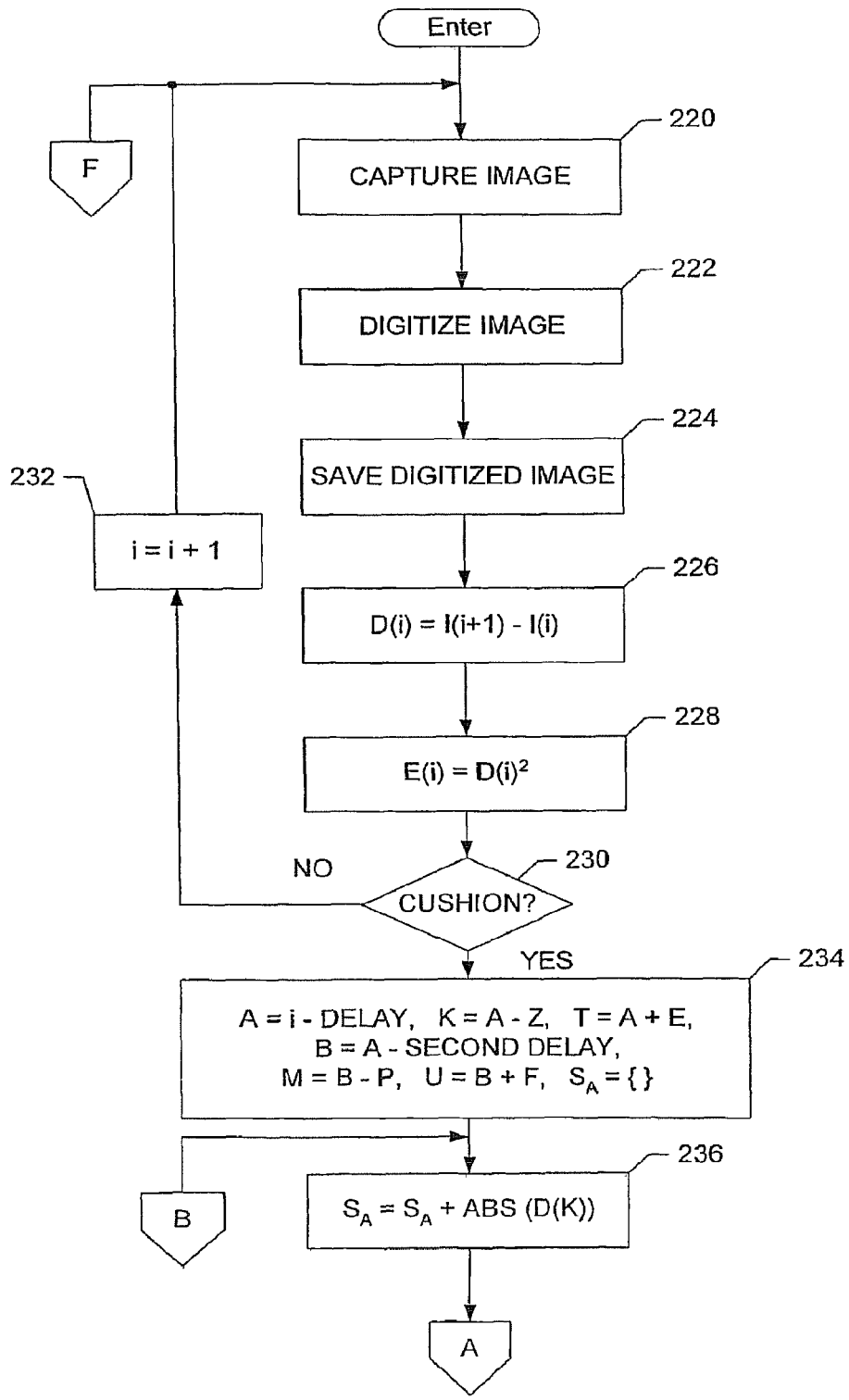
FIGS. 7A-7C are a flow chart illustrating example machine readable instructions which may be executed by the apparatus of FIG. 3 to implement the apparatus of FIGS. 5 and 6.
Figure 7B:
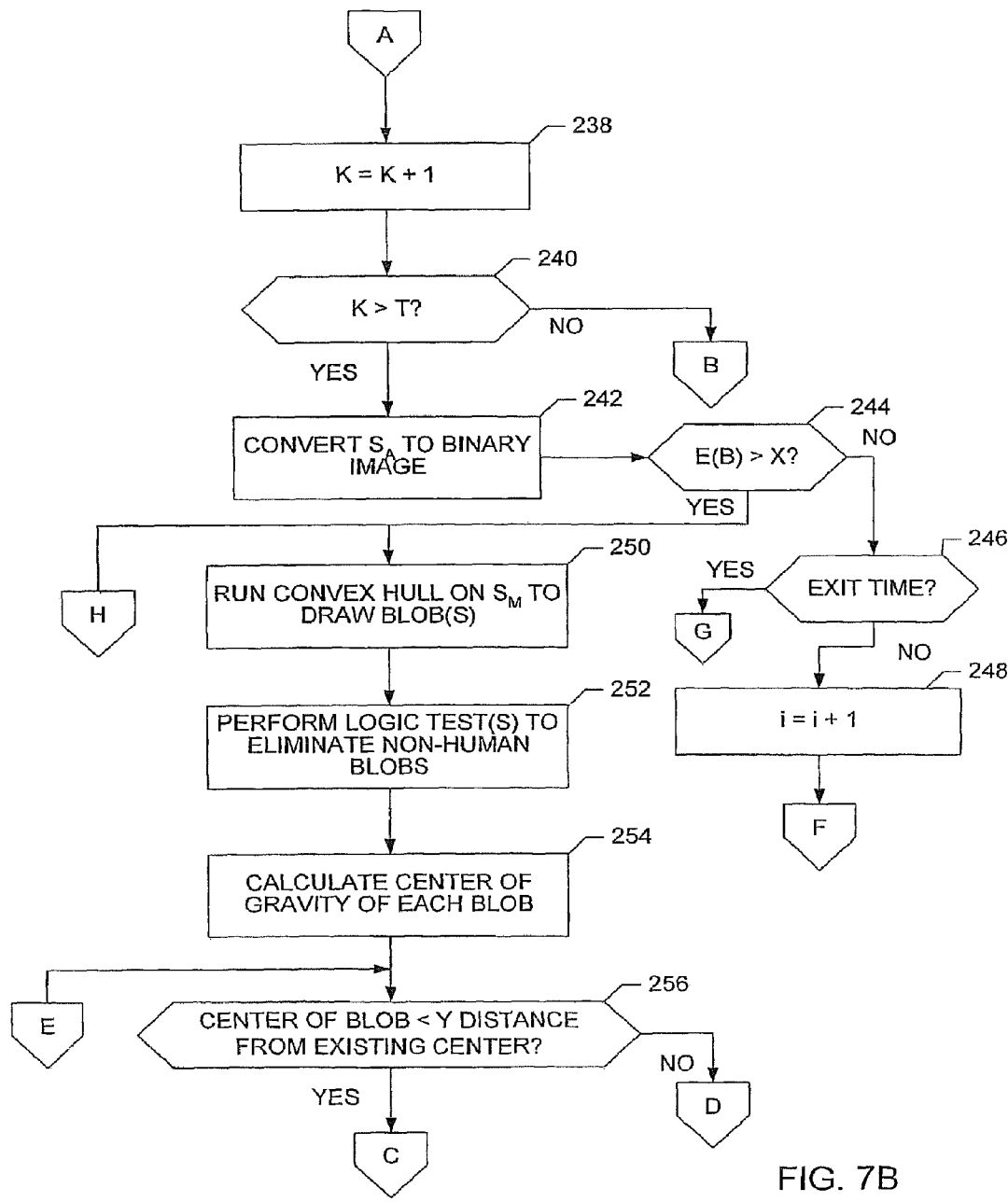
Figure 7C:
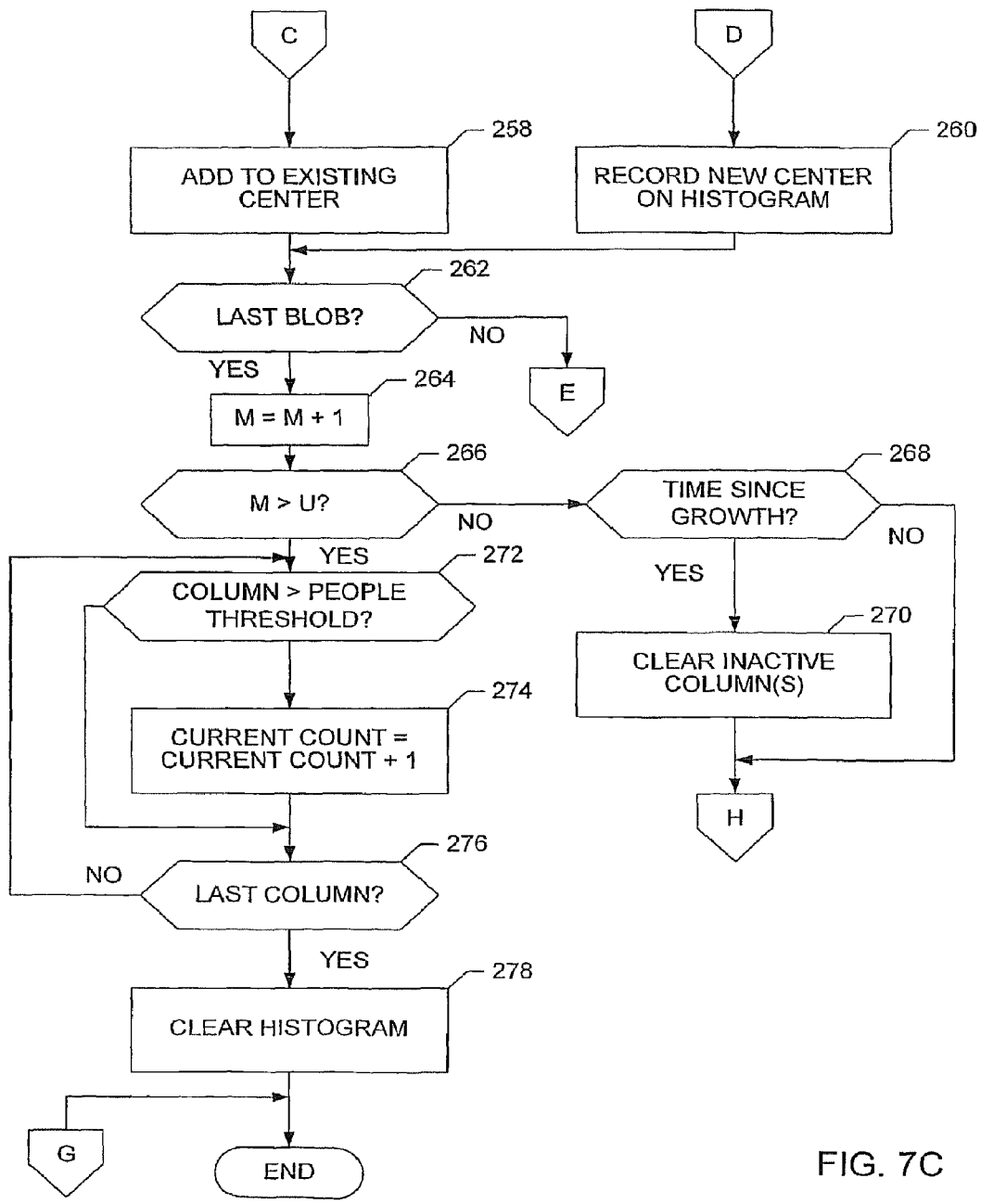

An example software program for implementing the apparatus 20 of FIGS. 5-6, is shown in FIGS. 7A-7C. In this example, the program is for execution by a processor such as the processor 54 shown in the example of FIG. 3, and the program is embodied in software stored on a tangible medium such as a compact disk (CD), a floppy disk, a hard drive, a digital versatile disk (DVD), or a memory associated with the processor 54. However, persons of ordinary skill in the art will readily appreciate that the entire program or parts thereof could alternatively be executed by a device other than the processor 54 and/or embodied in firmware or dedicated hardware in a well known manner. For example, any or all of the motion detector 180, the shape outliner 182, the image amalgamator 184, the blob discriminator 190, the non-human filter 188, the center locator 192, the center comparator 194, the energy detector 200, the threshold counter 198 and/or the false motion filter 202 could be implemented by software, hardware, and/or firmware. Further, although the example program is described with reference to the flowchart illustrated in FIGS. 7A-7C, persons of ordinary skill in the art will readily appreciate that many other methods of implementing the example people counter 20 may alternatively be used. For example, the order of execution of the blocks may be changed, and/or some of the blocks described may be changed, eliminated, and/or combined.

The program of FIGS. 7A-7C may be used with the program of FIGS. 4A-4D to implement the apparatus 10. If so implemented, the program of FIGS. 7A-7C replaces blocks 122-128 of FIG. 4B. However, persons of ordinary skill in the art will readily appreciate that the program of FIGS. 7A-7C could be implemented without the program of FIGS. 4A-4D or vice versa. For example, the program of FIGS. 4A-4D could use an entirely different method of counting people in an image and/or the program of FIGS. 7A-7C could be used for applications other than audience measurement. In the following, it is assumed that the program of FIGS. 7A-7C is used in the program of FIGS. 4A-4D. Therefore, in this example, control enters the program of FIG. 7A via block 118 or 120 of FIG. 4B.

Turning to FIG. 7A, the program begins when the image sensor 18 captures an image of the audience in question (block 220). The digitizer 52 then digitizes the captured image into an array of eight bit values as explained above (block 222). If this is the first image captured by the sensor 18 (i.e., the program has just been started after a power-off time), then two images are captured and digitized (blocks 220-222). The digitized image(s) are then saved in the memory 30 (block 224).

The motion detector 180 then computes the difference image between the most recently captured image and the immediately preceding image stored in memory (block 226). As discussed above, the difference image is calculated by subtracting the elements of the most recently captured image array from the corresponding elements of the most recently stored image array in accordance with the conventional rules of linear algebra.

Once the difference image is calculated (block 226), the energy detector 200 calculates the energy value associated with the difference image (block 228). As explained above, this energy value is computed by squaring the array of the difference image and then summing all of the values contained in the array generated by the squaring operation. The energy value is stored in memory 30 for later use as explained below.

Because many of the calculations performed by the people counter 20 require data corresponding to images taken before and after a motion marker, it is necessary to have a running sequence of pictures to operate upon. Therefore, before creating any amalgamated images, the people counter 20 creates a buffer of captured images and difference images. Thus, at block 230, the people counter 20 determines whether the desired buffer has been created. If not, control loops back to block 220 via block 232. At block 232 a captured image counter i is incremented. Control continues to loop through blocks 220-232 until the desired buffer of captured images and difference images corresponding to those captured images has been created (block 230).

Assuming the desired buffer is in place (block 230), control advances to block 234. At block 234 a number of counters are initialized. For example, an amalgamation counter A is set to equal the image counter i less the buffer size. A histogram loop counter B is set to equal the amalgamation counter less a delay value sufficient to ensure all needed amalgamation image arrays have been computed prior to initiating population of a histogram. A range counter K is set to equal the amalgamation counter A−Z, a variable setting the earliest difference image to be used in creating an amalgamated image corresponding to time A. A range counter M is set to equal the histogram loop counter B−P, a variable setting the earliest amalgamated image to be used in creating a histogram corresponding to a motion marker occurring at time B. A threshold T is set equal to the amalgamation counter A+E, a variable setting the latest difference image to be used in creating an amalgamated image corresponding to time A. A second threshold U is set to equal the histogram loop counter B+F, a variable setting the latest amalgamated image to be used in creating a histogram corresponding to a motion marker occurring at time B. Additionally, the amalgamation array $S_A$ for time A is cleared to an empty set. Persons of ordinary skill in the art will appreciate that the variables Z and E may optionally be identical. Similarly, the variables P and F may optionally be identical.

Once the variables are initialized as explained above (block 234), the image amalgamator 184 sums the amalgamation array SA with the difference image array associated with time K on an element by element basis (block 236). The counter K is then incremented (block 238). If the counter K has not surpassed the threshold T (block 240), control returns to block 236 where the image amalgamator 184 adds the next difference image array to the amalgamated image array. Control continues to loop through blocks 236-240 until the counter K equals or exceeds the threshold T (block 240).

When the compilation of the amalgamated image array is completed (block 240), the image amalgamator 184 converts the amalgamated image array SA into a binary image (block 242). Converting the amalgamated image array to a binary image can be accomplished by, for example, dividing each element in the amalgamated image array by the number of difference images used to form the amalgamated image array (e.g., by (Z+E)).

The energy detector 200 then determines whether the energy value associated with time B is greater than an energy threshold X (i.e., whether a motion marker is set at time B) (block 244). The energy threshold X is a value that indicates the amount of movement energy that is required in a difference image to suggest that an audience composition change is occurring. If a motion marker is set at time B, then control advances to block 250. Otherwise, the people counter routine determines whether it has been executing for too long of a time (block 246). If so, the people counter routine terminates and control advances to block 134 of FIG. 4B. As with many blocks of FIGS. 7A-7C, block 246 is not required in all applications. It is included in the illustrated example wherein the people counter routine is inserted in the program of FIGS. 4A-4D to enable the program to periodically check for source changes (block 118). Were blocks 246 not employed in this context, it would be possible to miss several source changes occurring while the audience composition remains constant as control would otherwise continue to loop within the people counter routine until a motion marker were reached.

Assuming it is not time to exit the people counter routine to check for source changes or a turn-off event (block 246), control advances to block 248. At block 248 the captured image counter i is incremented. Control then returns to block 220 (FIG. 7A) where another image is captured. Control continues to loop through blocks 220-248 until a motion marker is reached (block 244), or a time to check for a source change or turn-off event is reached (block 246).

Assuming for purposes of discussion that a motion marker is located at time B (block 244), control enters a loop wherein a histogram corresponding to the time period beginning at time M (i.e., time (B−P)) and ending at time U (i.e., time (B+F)) is populated. In particular, at block 250, the shape outliner 182 executes the convex hull process on the points appearing in the amalgamated image array SM corresponding to time M. As explained above, if any points are presenting the amalgamated image array SM, the execution of the convex hull process draws one or more blob(s) in the amalgamated image array SM.

Once the blob(s) (if any) are drawn, the non-human filter 188 performs one or more logic test(s) on the blob(s) to attempt to eliminate non-human blob(s) from the amalgamated image array SM (block 252). As explained above, many different logic tests may be used for this purpose including, by way of examples, not limitations, a location test and/or a size test.

Once the non-human filter 188 has completed execution, the center locator 192 calculates the center of gravity of each remaining blob (if any) in the amalgamated image array SM (block 254). As explained above, this calculation may be performed by averaging the X-axis values for each point in the blob in question.

Irrespective of how the center(s) of the blob(s) are identified, once the centers are calculated, the center comparator 192 attempts to record the blob(s) in the histogram. In particular, the center comparator 192 determines if the center of a first one of the blob(s) (if any) in the amalgamated image SM is located within a predetermined distance Y of a center of an object already recorded in the histogram (block 256). The predetermined distance is preferably selected to correspond to the expected size of a person along the x-axis of an image (e.g., 40 pixels). As explained above, this test is performed to ensure that slight differences in the centers of blobs do not cause the same blob to be identified as two different blobs in different amalgamated images. If the center of the blob under consideration is within Y distance of a center already existing in the histogram (block 256), a symbol representative of the blob under consideration is added to the symbol representing the already existing center in the histogram (block 258, FIG. 7C). If the center of the blob under consideration is not within Y distance of a center already existing in the histogram (block 256), a symbol representative of the blob under consideration is added to the histogram as a new center representing a new blob (block 260, FIG. 7C).

Irrespective of whether control passes through block 258 or 260, when control reaches block 262, the center comparator 194 determines if there are more blobs to analyze within the amalgamated image SM under examination. If so, control returns to block 256 (FIG. 7B). Control continues to loop through blocks 256-262 until every blob appearing in the amalgamated image SM has been represented in the histogram. Control then advances to block 264.

At block 264, the range counter M is incremented. The blob discriminator 196 then determines whether the loop counter M is equal to or greater than the threshold U (block 266). If not, then all of the amalgamated images to be represented in the histogram have not yet been analyzed, and control advances to block 268. Otherwise, the histogram is complete and control advances to block 272.

Assuming for purposes of discussion that the histogram is not yet fully populated (block 266), the false motion filter 202 examines the histogram to determine if any symbols in the histogram have failed to grow within a predetermined time period (e.g., 3 minutes)(block 268). If any such inactive symbols exist (block 268), the false motion filter 202 assumes these inactive symbols are not representative of people and removes them from the histogram (block 270). Control then returns to block 250 (FIG. 7B) wherein the shape outliner 182 draws blob(s) around any points present in the next amalgamated image SM. If no inactive symbols exist in the histogram (block 268), control advances directly from block 268 (FIG. 7C) to block 250 (FIG. 7B).

Control continues to loop through blocks 250-270 until the loop counter M becomes equal to or greater than the threshold U (block 266). The histogram is then complete and ready for analysis. Accordingly, the histogram is latched and stored.

The threshold counter 198 then begins analyzing each symbol representative of a blob center appearing in the histogram (block 272). If a symbol being examined exceeds a predetermined threshold (block 272), the threshold counter 198 identifies the symbol as representative of a person. Accordingly, the CURRENT COUNT variable is incremented (block 274). If the symbol being examined does not exceed the predetermined threshold (block 272), the threshold counter 198 concludes that the symbol represents something other than a person and the CURRENT COUNT variable is, therefore, not incremented (block 272). The threshold counter 198 then determines if every symbol in the histogram has been analyzed (block 276). If not, control returns to block 272. Control continues to loop through blocks 272-276 until every symbol in the histogram has been identified as human or non-human and the human symbols have been counted (block 276). Once this process is completed (block 276), the histogram is cleared for the next round of analysis (block 278). The people counter routine then terminates. In the example of FIGS. 4A-4D, control then advances to block 134 of FIG. 4B.

Figure 8A:
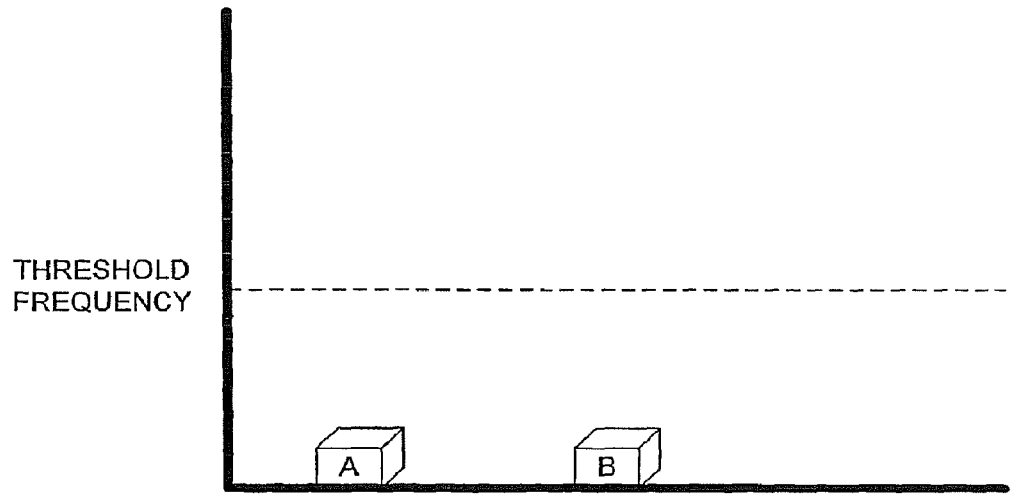
FIGS. 8A-8G illustrate example histograms developed by the apparatus of FIGS. 5 and 6.

To provide further illustration of the operation of the people counter 20 discussed in connection with FIGS. 5-7, an example histogram which could be generated by such an apparatus is shown in FIGS. 8A-8G. In the example of FIG. 8A, two blobs are present in the first amalgamated image examined by the blob discriminator 190. The centers of these blobs are calculated by the center locator 192 as being separated by more than the distance Y (e.g., 40 pixels). Accordingly, the two blobs are represented by two separate symbols A and B. Each of the symbols is located at the X-axis location of the blob it represents.

Figure 8B:
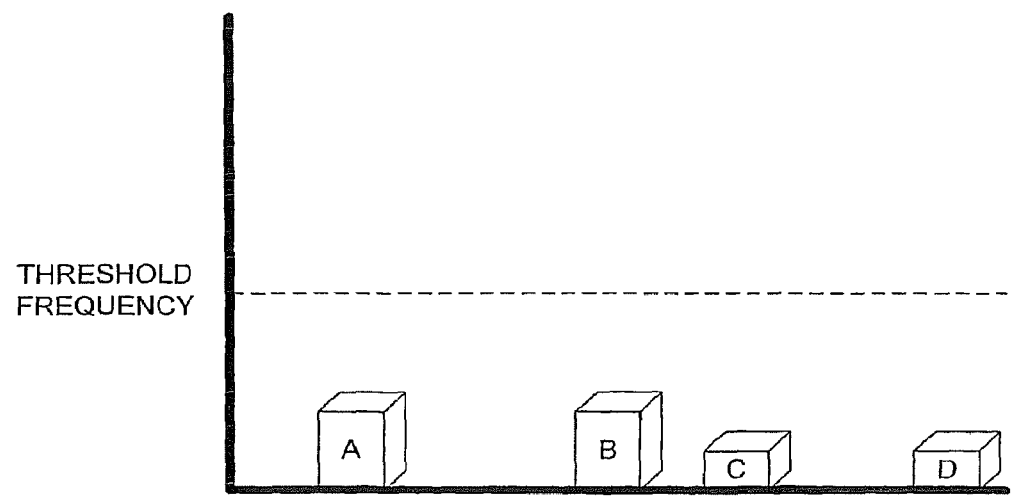

As shown in FIG. 8B, the next amalgamated image examined by the blob discriminator 190 contains 4 blobs. A first blob has a center identical to the center of symbol A. Therefore, a symbol representing the first blob is stacked on top of the symbol A such that symbol A "grows." Similarly, a second blob having a center identical to the center of symbol B is present in the second amalgamated image. Accordingly, symbol B also grows by virtue of the addition of another symbol to its height. The remaining two blobs have calculated centers that are separated by a distance greater than Y from both the center represented by symbol A and the center represented by symbol B. Accordingly, two new symbols C and D are added to the histogram at X-axis locations corresponding to the centers of the blobs they represent.

Figure 8C:
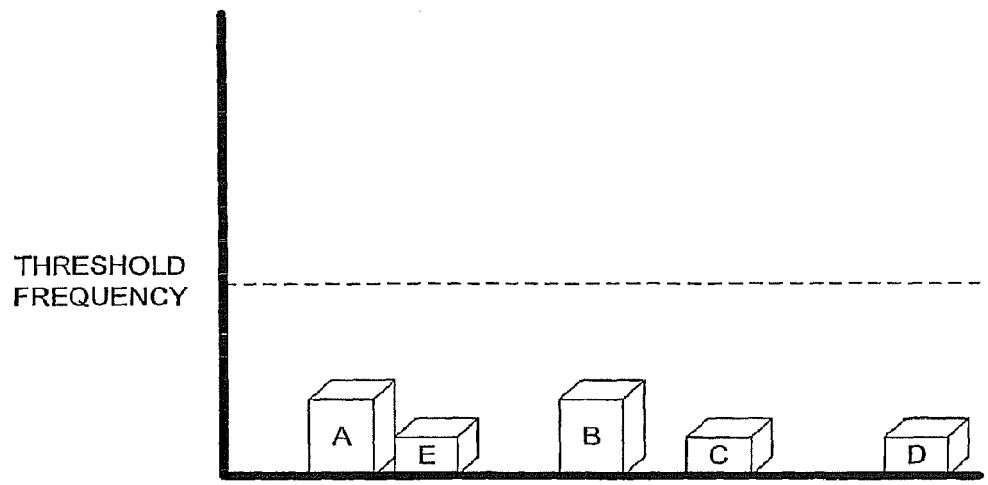
Figure 8D:
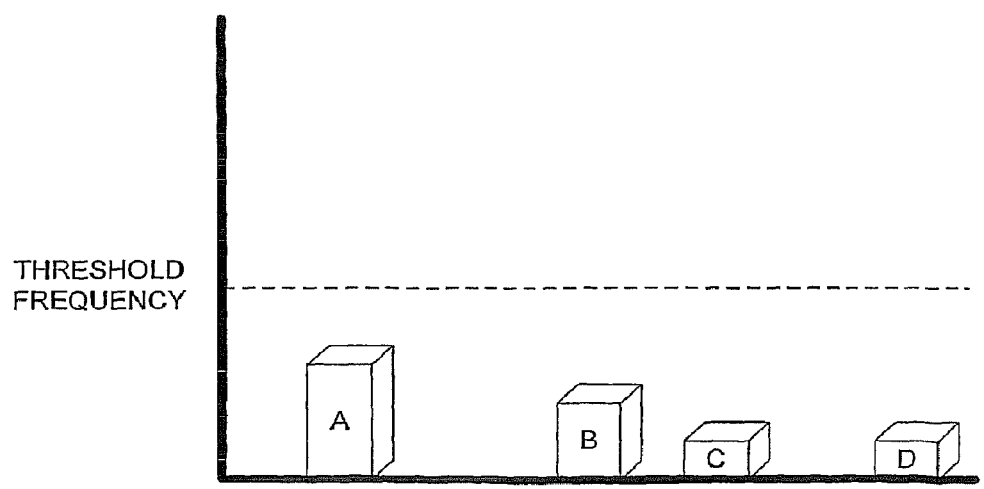

The third amalgamated image contains only one blob. As shown in FIG. 8C, that blob has a center located less than the distance Y from the center represented by symbol A (see symbol E). Accordingly, the center comparator 194 assumes that symbol E and symbol A represent the same object, and as shown in FIG. 8D, symbol E is merged with symbol A such that symbol A again grows.

Figure 8E:
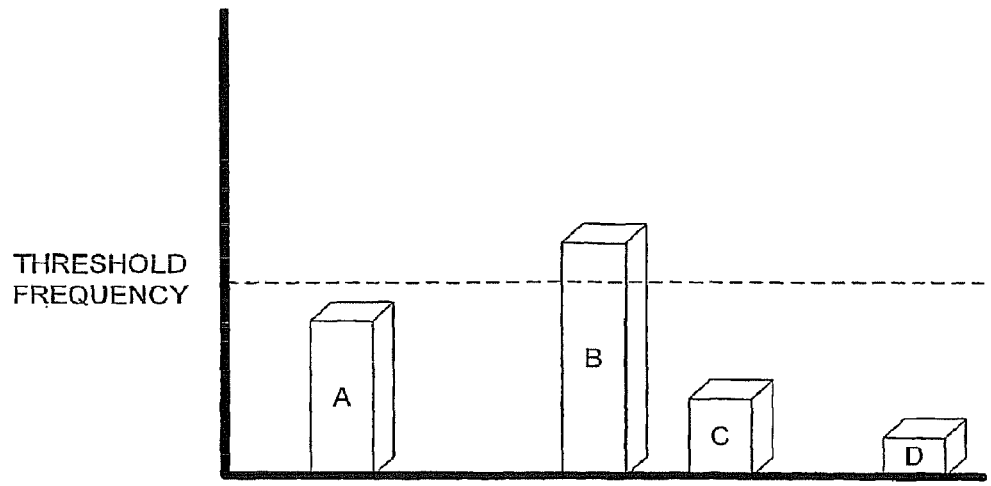

FIG. 8E represents the state of the histogram after several additional amalgamated images have been analyzed. As shown in FIG. 8E, the symbols A, B and C have all grown (although at different rates) since the time reflected in FIG. 8D. Symbol D, however, has not grown in that time period. Accordingly, as shown in FIG. 8F, the false motion filter 202 assumes the inactive symbol D corresponds to noise or some other non-human source, and the symbol D is, therefore, eliminated from the histogram.

Figure 8F:
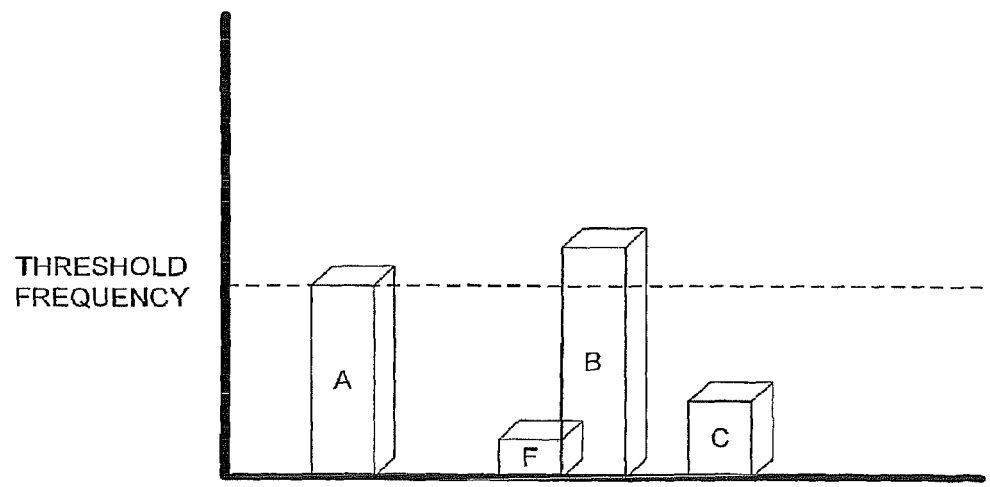

As also shown in FIG. 8F, the amalgamated image being added at this time has two blobs. One blob has the same center as symbol A and is, thus, merged with that symbol (compare FIG. 8E). The other blob (see symbol F) has a slightly different center than symbol B. However, the center of the second blob is less than the distance Y from the center represented by symbol B. Accordingly, as shown in FIG. 8G, the symbol F is merged with the symbol B.

Figure 8G:
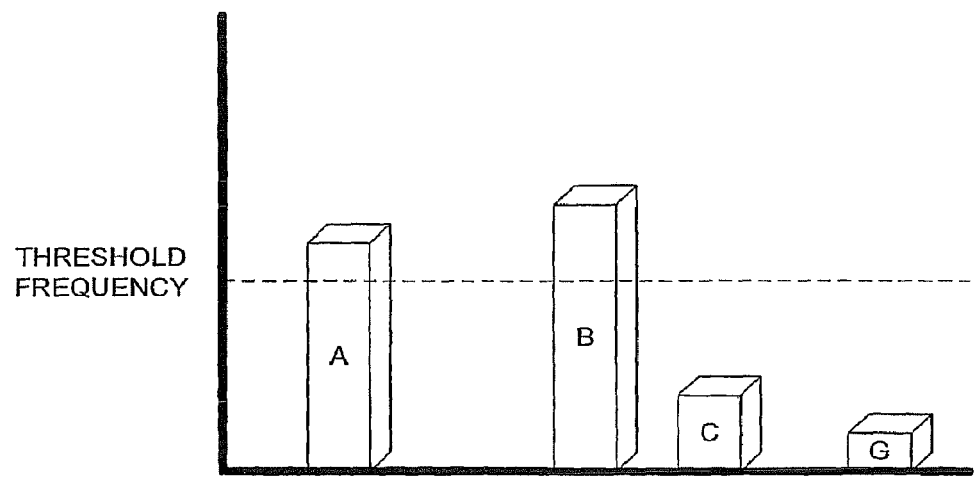

In the final state of the histogram reflected in FIG. 8G, symbols A and B have again grown and a new symbol G corresponding to a third blob appearing in the last amalgamated image has been added. In the final latched state shown in FIG. 8G, the symbols A and B are seen to have grown beyond the threshold frequency. Therefore, when the threshold counter 198 examines the histogram, it identifies symbols A and B as corresponding to persons, but symbols C and G are considered to be representative of non-humans. Accordingly, the threshold counter 198 counts two persons in the example of FIG. 8G.

Although certain example methods and apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method, comprising:
   maintaining a first count of a number of people detected in an environment based on image data representative of the environment;
   when the image data is indicative of a change in the number of people detected in the environment, presenting a request for identity information;
   determining, with a processor if the people were compliant in providing the identity information based on a difference between the number of people appearing in the image data and a second number of received identity responses; and
   when the people were non-compliant in providing the identity information, increasing, with the processor, a second count maintained for the environment indicative of unidentified people in the environment.

2. A method as defined in claim 1, further comprising storing the second count in a memory in association with a time stamp.

3. A method as defined in claim 1, wherein determining if the people were compliant in providing the identity information comprises determining whether the difference between the number of people appearing in the image data and the second number of received identity responses occurs a plurality of successive times.

4. A method as defined in claim 1, further comprising increasing the first count by a value of the second count to generate an increased first count, wherein the increased first count is to be used for analyzing subsequent instances of image data.

5. A method as defined in claim 1, wherein presenting the request for identity information comprises generating a visual display in the environment.

6. A method as defined in claim 1, wherein presenting the request for identity information comprises presenting a list of identifiers corresponding to persons of a household.

7. A method as defined in claim 1, further comprising associating media identifying information with at least one of the first count or the second count.

8. A tangible machine readable storage device or storage disc comprising instructions that, when executed, cause a machine to at least:
   maintain a first count of a number of people detected in an environment based on image data representative of the environment;
   when the image data is indicative of a change in the number of people detected in the environment, present a request for identity information;
   determine if the people were compliant in providing the identity information based on a difference between the number of people appearing in the image data and a second number of received identity responses; and
   when the people were non-compliant in providing the identity information, increase a second count maintained for the environment indicative of unidentified people in the environment.

9. A storage device or storage disc as defined in claim 8, wherein the instructions cause the machine to store the second count in a memory in association with a time stamp.

10. A storage device or storage disc as defined in claim 8, wherein the instructions cause the machine to determine if the people were compliant in providing the identity information by determining whether the difference between the number of people appearing in the image data and the second number of received identity responses is detected a plurality of successive times.

11. A storage device or storage disc as defined in claim 8, wherein the instructions cause the machine to increase the first count by a value of the second count to generate an increased first count, wherein the increased first count is to be used for analyzing subsequent instances of image data.

12. A storage device or storage disc as defined in claim 8, wherein the instructions cause the machine to present the request for identity information by generating a visual display in the environment.

13. A storage device or storage disc as defined in claim 8, wherein instructions cause the machine to present the request for identity information by presenting a list of identifiers corresponding to persons of a household.

14. A storage device or storage disc as defined in claim 8, wherein the instructions cause the machine to associate media identifying information with at least one of the first count or the second count.

15. An apparatus, comprising:
   a people counter to maintain a first count of a number of people detected in an environment based on image data representative of the environment;
   a change detector to, when the image data is indicative of a change in the number of people detected in the environment, present a request for identity information; and
   a compliance detector to:
      determine if the people were compliant in providing the identity information based on a difference between the number of people appearing in the image data and a second number of received identity responses; and
      when the people were non-compliant in providing the identity information, increase a second count maintained for the environment indicative of unidentified people in the environment, wherein at least one of the people counter, the change detector or the compliance detector is implemented via a logic circuit.

16. An apparatus as defined in claim 15, further comprising memory to store the second count in association with a time stamp.

17. An apparatus as defined in claim 15, wherein the compliance detector is to determine if the people were compliant in providing the identity information by determining whether the difference between the number of people appearing in the image data and the second number of received identity responses is detected a plurality of successive times.

18. An apparatus as defined in claim 15, wherein the people counter is to increase the first count by a value of the second count to generate an increased first count, wherein the increased first count is to be used for analyzing subsequent instances of image data.

19. An apparatus as defined in claim 15, wherein the compliance detector is to present the request for identity information by presenting a list of identifiers corresponding to persons of a household.

20. An apparatus as defined in claim 15, further comprising a media detector to associate media identifying information with at least one of the first count or the second count.

* * * * *